United States Patent
Yamanaka et al.

(10) Patent No.: US 10,577,501 B2
(45) Date of Patent: Mar. 3, 2020

(54) POLYPHENYLENE SULFIDE RESIN COMPOSITION AND HOLLOW FORMING PRODUCTS USING THE SAME

(71) Applicant: TORAY INDUSTRIES, INC., Tokyo (JP)

(72) Inventors: Yuji Yamanaka, Nagoya (JP); Kei Saito, Nagoya (JP); Hiroyuki Isago, Nagoya (JP); Takeshi Unohara, Nagoya (JP); Hideki Matsumoto, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/310,318

(22) PCT Filed: Jun. 23, 2017

(86) PCT No.: PCT/JP2017/023232
§ 371 (c)(1),
(2) Date: Dec. 14, 2018

(87) PCT Pub. No.: WO2018/003700
PCT Pub. Date: Jan. 4, 2018

(65) Prior Publication Data
US 2019/0330470 A1    Oct. 31, 2019

(30) Foreign Application Priority Data

Jun. 29, 2016 (JP) .................................. 2016-128611
Jul. 28, 2016 (JP) .................................. 2016-148385
Feb. 28, 2017 (JP) .................................. 2017-036302

(51) Int. Cl.
| | | |
|---|---|---|
| *C08L 81/02* | (2006.01) | |
| *C08L 77/00* | (2006.01) | |
| *C08L 101/06* | (2006.01) | |
| *F02M 35/10* | (2006.01) | |

(52) U.S. Cl.
CPC ............ *C08L 81/02* (2013.01); *C08L 77/00* (2013.01); *C08L 101/06* (2013.01); *F02M 35/10321* (2013.01)

(58) Field of Classification Search
CPC .......... C08L 81/02; C08L 77/00; C08L 77/02; C08L 77/04; C08L 77/06; C08L 23/02; C08L 37/00
See application file for complete search history.

(56) References Cited

U.S. PATENT DOCUMENTS

| | | | | |
|---|---|---|---|---|
| 5,436,300 A * | 7/1995 | Kashiwadate | .......... | C08L 81/02 525/420 |
| 5,449,722 A * | 9/1995 | Nishida | ................. | C08L 101/00 524/447 |
| 5,625,002 A * | 4/1997 | Kadoi | ...................... | C08L 63/00 524/609 |
| 6,485,806 B1 * | 11/2002 | Tateyama | ................... | B32B 1/08 428/36.9 |
| 6,960,628 B2 * | 11/2005 | Matsuoka | ............... | C08L 81/02 525/150 |
| 7,303,822 B1 * | 12/2007 | Matsuoka | ............... | B32B 27/32 428/474.4 |
| 2007/0265375 A1 * | 11/2007 | Ishio | ....................... | C08L 81/02 524/114 |
| 2015/0232664 A1 * | 8/2015 | Guo | ........................ | C08L 77/02 252/75 |

FOREIGN PATENT DOCUMENTS

| | | |
|---|---|---|
| JP | H3 056561 A | 3/1991 |
| JP | H07-82479 A | 3/1995 |
| JP | 10-138372 A | 5/1998 |
| JP | 10-298431 A | 11/1998 |
| JP | 11-228827 A | 8/1999 |
| JP | 2004-059757 A | 2/2004 |
| JP | 2004-217888 A | 8/2004 |
| JP | 2005-90593 A | 4/2005 |
| JP | 2008-087168 A | 4/2008 |
| JP | 2008-213457 A | 9/2008 |
| JP | 2008-213458 A | 9/2008 |
| JP | 2009-35731 A | 2/2009 |
| WO | 2009/119624 A1 | 10/2009 |
| WO | 2011/148929 A1 | 12/2011 |

OTHER PUBLICATIONS

Gui et al. J. Appl. Polym. Sci. 2013, DOI: 10.1002/APP.3961 (Year: 2013).*
The Extended European Search Report dated Nov. 29, 2019, of counterpart European Application No. 17820057.2.

* cited by examiner

*Primary Examiner* — Michael M Dollinger
(74) *Attorney, Agent, or Firm* — DLA Piper LLP (US)

(57) ABSTRACT

A polyphenylene sulfide resin composition includes a polyphenylene sulfide resin (A), an amino group-containing compound (B), an epoxy group-containing elastomer (C), wherein the polyphenylene sulfide resin (A) forms a continuous phase and the amino group-containing compound (B) and the epoxy group-containing elastomer (C) form a dispersed phase in the morphology of a forming product composed of the resin composition observed with a transmission electron microscope, and the modulus of elongation (the elastic modulus determined by performing a tensile test on an ASTM type 1 dumbbell test piece obtained by injection molding at a cylinder temperature of 300° C. and at a mold temperature of 150° C., under the conditions in which the distance between chucks is 114 mm, the test piece distance is 100 mm, and the elongation rate is 10 mm/min) of the resin composition is 1.0 MPa or more and 1000 MPa or less.

12 Claims, No Drawings

POLYPHENYLENE SULFIDE RESIN COMPOSITION AND HOLLOW FORMING PRODUCTS USING THE SAME

TECHNICAL FIELD

The present invention relates to a polyphenylene sulfide resin composition which is excellent in heat aging resistance and chemical resistance while exhibiting high flexibility and high toughness, and hollow forming products using the polyphenylene sulfide resin composition.

BACKGROUND ART

In recent years, methods for improving fuel efficiency by using resins in ducts in an engine room as automobile parts and thus reducing the weight have been widespread, and at the present time, polyamide materials are mainly used.

On the other hand, from the viewpoint of lower environmental burdens, a vehicle in which an exhaust gas recirculation mechanism is incorporated has also become popular. The exhaust gas recirculation mechanism returns the exhaust gas generated from the internal combustion engine to the intake duct for the purpose of suppressing the amount of NOx generated and also improving the fuel efficiency by reducing pumping losses. In this case, the inside of the intake duct is more exposed to acid than in a regular mechanism, and the environment of a high temperature and a high pressure is also created. The conventional resin ducts cannot sufficiently maintain the durability, causing the decrease in toughness, flexibility and strength. As a result, a problem of cracks and ruptures of ducts arises. Therefore, materials which are excellent in heat resistance, heat aging resistance, chemical resistance and toughness have been studied. Furthermore, in recent years particularly, as the space inside the engine room has been reduced, materials having flexibility in addition to heat resistance, heat aging resistance and chemical resistance have been required from the viewpoint of improving the assembling property, the vibration absorption and the like.

Since a polyphenylene sulfide (hereinafter abbreviated as PPS in some cases) resin has properties suitable for engineering plastics such as excellent heat resistance, chemical resistance, flame retardance, electric insulation, moist heat resistance and the like, the polyphenylene sulfide resin has been widely used for electric and electronic parts, communication device parts, automobile parts, and the like. On the other hand, since the PPS resin is hard and brittle, many studies have been reported in which the flexibility and the toughness are improved by blending an elastomer in the PPS resin. However, in many cases, only a certain degree of flexibility can be obtained because the blending amount of the elastomer is small. Therefore, there has been a limit to the expansion of the uses as a flexible material such as the use by bending the forming product freely. Furthermore, even if the blending amount of the elastomer is increased in order to impart high flexibility, properties resulting from the elastomer is exhibited strongly because a phase structure in which the elastomer phase forms a continuous phase while the polyphenylene sulfide phase forms a dispersed phase is formed. As a result, the excellent heat resistance and chemical resistance inherent to the PPS resin are sacrificed, and in addition, a new problem such as a remarkable decrease in mechanical properties after the heat treatment at a high temperature occurs.

In response to such problems, as a technique for improving the flexibility and the toughness of the PPS, for example, a composition composed of a polyphenylene sulfide resin having a certain melt viscosity and a certain extraction amount of chloroform and an olefin resin has been considered (for example, see Patent Document 1).

As a material which is excellent in toughness and chemical resistance, for example, a resin composition composed of a polyphenylene sulfide resin, a polyamide resin and an epoxy group-containing copolymer has been also considered (for example, see Patent Document 2).

Moreover, as a material which is excellent in toughness, impact resistance and chemical resistance, for example, a resin composition composed of a polyphenylene sulfide resin, a polyamide resin and an elastomer has been considered, wherein the polyphenylene sulfide resin forms a continuous phase while the polyamide resin forms a dispersed phase, and an acid-modified ethylene/a olefin copolymer elastomer is dispersed in the dispersed phase of the polyamide resin (for example, see Patent Document 3).

Furthermore, as a material for a blow hollow forming product which is excellent in mechanical strength and refrigerant impact resistance, for example, a resin composition composed of a polyarylene sulfide resin having a certain amount of carboxyl group and a certain melt viscosity and a polyolefin having an epoxy group, and a blow hollow forming product have been studied (see, for example, Patent Document 4).

In addition, as a material which is suitable for hollow forming products and is excellent in toughness, chemical resistance, and surface smoothness, for example, a resin composition composed of a polyphenylene sulfide resin and an elastomer of a polyamide resin and/or a saturated polyester resin has been considered (for example, see Patent Document 5).

PRIOR ART REFERENCES

Patent Documents

[PATENT DOCUMENT 1] JP2004-217888A
[PATENT DOCUMENT 2] JP H3-056561A
[PATENT DOCUMENT 3] JP2004-059757A
[PATENT DOCUMENT 4] WO2011-148929
[PATENT DOCUMENT 5] JP H10-298431A

SUMMARY OF THE INVENTION

Problems to be Solved by the Invention

However, the resin composition described in Patent Document 1 had a problem of inferior flexibility because of a small blending amount of the elastomer.

Although the resin composition described in Patent Document 2 was excellent in toughness and chemical resistance, the object thereof was to achieve the properties of both the polyphenylene sulfide resin and the polyamide resin, and hence the epoxy group-containing copolymer was added in a small amount just in order to improve the compatibility between the polyphenylene sulfide resin and the polyamide resin, resulting in the insufficient flexibility.

The resin composition described in Patent Document 3 was excellent in toughness and impact resistance and had a certain degree of flexibility, but it is not recognized that the resin composition had sufficient flexibility because of the small amount of the elastomer. Moreover, upon the treatment at a high temperature of 150° C. or more for a long time or upon the treatment under acidic conditions for a long time, the beat aging tended to proceed easily, causing a problem of the significant loss in toughness, flexibility and strength.

Although the resin composition for blow hollow molding described in Patent Document 4 was excellent in mechanical strength and refrigerant impact resistance, it is hard to say that the flexibility was sufficient because the blending amount of the elastomer was small.

The resin composition described in Patent Document 5 was excellent in toughness and impact resistance, but since the blending amount of the elastomer was small, there was a problem of the inferior flexibility.

Means for Solving the Problems

In order to solve the above problems, the present inventors have discovered, as a result of dedicated studies, that high flexibility and toughness as well as remarkably excellent heat resistance, chemical resistance and heat aging resistance are achieved, which was difficult with a conventional technology, in a resin composition comprising a polyphenylene sulfide resin, an amino group-containing compound and an epoxy group-containing elastomer, wherein the modulus of elongation (the elastic modulus determined by performing a tensile test on an ASTM type 1 dumbbell test piece obtained by injection molding at a cylinder temperature of 300° C. and at a mold temperature of 150° C., under the conditions in which the distance between chucks is 114 mm, the test piece distance is 100 mm, and the elongation rate is 10 mm/min) is in a range of 1.0 MPa or more and 1000 MPa or less, and a phase structure is established in which the polyphenylene sulfide resin forms a continuous phase while the amino group-containing compound and the epoxy group-containing elastomer form a dispersed phase, and thus resulted in the present invention.

That is, the present invention has following structures.

1. A polyphenylene sulfide resin composition, comprising a polyphenylene sulfide resin (A), an amino group-containing compound (B), and an epoxy group-containing elastomer (C), wherein the polyphenylene sulfide resin (A) forms a continuous phase and the amino group-containing compound (B) and the epoxy group-containing elastomer (C) form a dispersed phase in the morphology of a forming product composed of the resin composition observed with a transmission electron microscope, and the modulus of elongation (the elastic modulus determined by performing a tensile test on an ASTM type 1 dumbbell test piece obtained by injection molding at a cylinder temperature of 300° C. and at a mold temperature of 150° C., under the conditions in which the distance between chucks is 114 mm, the test piece distance is 100 mm, and the elongation rate is 10 mm/min) of the resin composition is 1.0 MPa or more and 1000 MPa or less.

2. The polyphenylene sulfide resin composition according to 1 as above, comprising 0.01 to 200 parts by weight of the amino group-containing compound (B) and 1 to 200 parts by weight of the epoxy group-containing elastomer (C) based on 100 parts by weight of the polyphenylene sulfide resin (A).

3. The polyphenylene sulfide resin composition according to 1 or 2 as above, wherein the blending amount of the epoxy group-containing elastomer (C) is more than 30% by weight and 70% by weight or less when the total of the polyphenylene sulfide resin (A), the amino group-containing compound (B), and the epoxy group-containing elastomer (C) is 100% by weight.

4. The polyphenylene sulfide resin composition according to any one of 1 to 3 as above, wherein the amino group-containing compound (B) is a polyamide resin.

5. The polyphenylene sulfide resin composition according to any one of 1 to 4 as above, further comprising an elastomer (D) not containing a functional group in an amount such that the total amount of the elastomer (D) and the epoxy group-containing elastomer (C) is 200 parts by weight or less based on 100 parts by weight of the polyphenylene sulfide resin (A).

6. The polyphenylene sulfide resin composition according to any one of 1 to 5 as above, wherein the amino group-containing compound (B) forms a secondary dispersed phase in the dispersed phase of the epoxy group-containing elastomer (C).

7. The polyphenylene sulfide resin composition according to any one of 1 to 6 as above, which is a polyphenylene sulfide resin composition for an intake duct which comes in contact with exhaust condensation water of an internal combustion engine.

8. A forming product composed of the polyphenylene sulfide resin composition according to any one of 1 to 7 as above.

9. The forming product according to 8 as above, which is a hollow forming product.

10. The forming product according to 9 as above, wherein the hollow forming product is a duct which comes in contact with exhaust condensation water of an internal combustion engine.

11. The forming product according to 10 as above, wherein the duct is an intake duct.

12. The forming product according to 11 as above, wherein the intake duct is an intake duct for a forced induction engine.

13. The forming product according to 12 as above, wherein the intake duct for a forced induction engine is a duct that connects a turbocharger or a supercharger and an intercooler.

Effect of the Invention

According to the present invention, a polyphenylene sulfide resin composition which exhibits a highly low elastic modulus, flexibility and high toughness, and which also shows remarkably improved heat aging resistance and chemical resistance is obtained. These properties are suitable for the application such as in tubes and hoses used by fitting and bending them, and in particular, ducts and hoses around automobile engines used at a high temperature and under vibration.

MODE FOR CARRYING OUT THE INVENTION

The present invention will be described in detail below.

The polyphenylene sulfide resin (A) (hereinafter abbreviated as PPS resin in some cases) used in the present invention is a polymer having a repeating unit represented by the following structural formula.

[Chem 1]

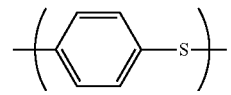

From the viewpoint of the heat resistance, the polymer preferably contains 70% by mole or more, and further 90% by mole or more of the polymer containing the repeating units represented by the above structural formula. Moreover, less than 30% by mole of the repeating units of the PPS resin (A) may be constituted by a repeating unit having the following structure, or the like.

[Chem 2]

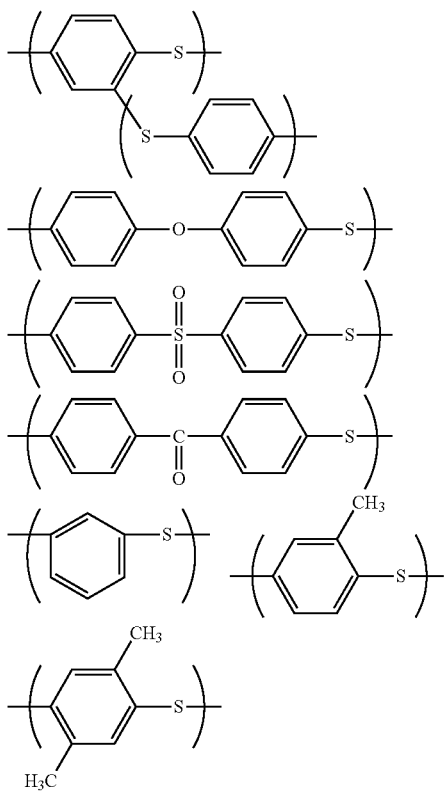

Since the PPS copolymer (A) having such a structure partially has a low melting point, the resulting resin composition is advantageous in formability.

The melt viscosity of the PPS resin (A) used in the present invention is not particularly limited, but in order to obtain more excellent toughness, the melt viscosity thereof is preferably high. For example, the range of more than 30 Pa·s is preferred, the range of 50 Pa·s or more is more preferred, and the range of 100 Pa·s or more is further preferred. From the viewpoint of maintaining the melt flow property, the upper limit is preferably 600 Pa·s or less.

The melt viscosity in the present invention is a value measured using Capilograph manufactured by TOYO SEIKI SEISAKU-SHO, LTD under the conditions of 310° C. and the shear rate of 1000/s.

A method of producing the PPS resin (A) used in the present invention will be explained below, but the method is not limited to the following method as long as the PPS resin (A) of the above structure is obtained.

First of all, a polyhalogenated aromatic compound, a sulfiding agent, a polymerization solvent, a molecular weight adjusting agent, a polymerization auxiliary agent, and the polymerization stabilizer which are used in the production method are explained.

[Polyhalogenated Aromatic Compound]

The polyhalogenated aromatic compound refers to a compound which has two or more halogen atoms in one molecule. The specific examples include polyhalogenated aromatic compounds such as p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene. The p-dichlorobenzene is preferably used. It is also possible to combine two or more different kinds of polyhalogenated aromatic compounds to form a copolymer, but the p-dihalogenated aromatic compound is preferably used as a main component.

From the viewpoint of obtaining the PPS resin (A) having a viscosity suitable for processing, the amount of the polyhalogenated aromatic compound to be used is, as an example, in a range of 0.9 to 2.0 mol, preferably of 0.95 to 1.5 mol, and further preferably of 1.005 to 1.2 mol per mole of the sulfiding agent.

[Sulfiding Agent]

Examples of sulfiding agents include alkali metal sulfides, alkali metal hydrosulfides, and hydrogen sulfides.

Specific examples of the alkali metal sulfides include lithium sulfide, sodium sulfide, potassium sulfide, rubidium sulfide, cesium sulfide, and mixtures of two or more kinds of these, and in particular, sodium sulfide is preferably used. These alkali metal sulfides can be used as hydrates or aqueous mixtures or in the anhydrous form.

Specific examples of the alkali metal hydrosulfides include sodium hydrosulfide, potassium hydrosulfide, lithium hydrosulfide, rubidium hydrosulfide, cesium hydrosulfide, and mixtures of two or more kinds of these, and in particular, sodium hydrosulfide is preferably used. These alkali metal hydrosulfides can be used as hydrates or aqueous mixtures or in the anhydrous form.

An alkali metal sulfide prepared in situ in a reaction system from an alkali metal hydrosulfide and an alkali metal hydroxide can be also used. Moreover, an alkali metal sulfide can be prepared from an alkali metal hydrosulfide and an alkali metal hydroxide and then transferred to a polymerization tank for use.

Alternatively, an alkali metal sulfide prepared in situ in a reaction system from an alkali metal hydroxide such as lithium hydroxide and sodium hydroxide and hydrogen sulfide can be also used. In addition, an alkali metal sulfide can be prepared from an alkali metal hydroxide such as lithium hydroxide and sodium hydroxide and hydrogen sulfide and then transferred to a polymerization tank for use.

When a part of the sulfiding agent is lost before the start of the polymerization reaction due to a dehydration operation or the like, the amount of the sulfiding agent to be charged means the residual amount obtained by subtracting the lost content from the actual charged amount.

It is also possible to use an alkali metal hydroxide and/or an alkaline earth metal hydroxide in combination with the sulfiding agent. Specific examples of alkali metal hydroxides preferably include sodium hydroxide, potassium hydroxide, lithium hydroxide, rubidium hydroxide, cesium hydroxide and mixtures of two or more kinds of these. Specific examples of alkaline earth metal hydroxides include calcium hydroxide, strontium hydroxide, barium hydroxide and the like, and among these, sodium hydroxide is preferably used.

When an alkali metal hydrosulfide is used as a sulfiding agent, it is particularly preferred that an alkali metal hydroxide is used at the same time. The amount of thereof to be used is, as an example, in a range of 0.95 to 1.20 mol, preferably of 1.00 to 1.15 mol, and further preferably of 1.005 to 1.100 mol based on 1 mol of the alkali metal hydrosulfide.

[Polymerization Solvent]

As the polymerization solvent, a polar organic solvent is preferably used. Specific examples thereof include N-alkylpyrrolidones such as N-methyl-2-pyrrolidone and N-ethyl-2-pyrrolidone, caprolactams such as N-methyl-ε-caprolactam, aprotic organic solvents represented by 1,3-dimethyl-2-imidazolidinone, N,N-dimethylacetamide, N,N-dimethylformamide, hexamethylphosphoric triamide, dimethyl sulfone, tetramethylene sulfoxide or the like, and mixtures thereof. All of these are preferably used because of their high reaction stability. Among these, in particular, N-methyl-2-pyrrolidone (hereinafter, abbreviated as NMP in some cases) is preferably used.

The amount of the polar organic solvent to be used is selected from the range of 2.0 mol to 10 mol, preferably of 2.25 to 6.0 mol, and more preferably of 2.5 to 5.5 mol per mole of the sulfiding agent.

[Molecular Weight Adjusting Agent]

In order to form an end which is reactive with the produced PPS resin (A), or to control the polymerization reaction or the molecular weight, a monohalogen compound (which may not necessarily be an aromatic compound) can be used with the polyhalogenated aromatic compound in combination.

[Polymerization Auxiliary Agent]

In one preferred aspect, a polymerization auxiliary agent is used in order to obtain the PPS resin (A) with a relatively high degree of polymerization for a shorter time. The polymerization auxiliary agent as used herein indicates a substance which has an effect of increasing the viscosity of the resulting PPS resin (A). Specific examples of such polymerization auxiliary agents include organic carboxylates, water, alkali metal chlorides, organic sulfonates, alkali metal sulfates, alkaline earth metal oxides, alkali metal phosphates and alkaline earth metal phosphates and the like. One of these can be used alone, or two or more kinds can be used at the same time. Among these, organic carboxylates, water, alkali metal chlorides are preferred. As an organic carboxylate, an alkali metal carboxylate is further preferred, and as an alkali metal chloride, lithium chloride is further preferred.

The alkali metal carboxylate is a compound represented by the general formula R(COOM)n (wherein R is a $C_1$-$C_{20}$ alkyl group, cycloalkyl group, aryl group, alkylaryl group or arylalkyl group, M is an alkali metal selected from lithium, sodium, potassium, rubidium and cesium, and n is an integer of 1 to 3). The alkali metal carboxylate can be used as a hydrate, anhydrate or a solution. Specific examples of alkali metal carboxylates include lithium acetate, sodium acetate, potassium acetate, sodium propionate, lithium valerate, sodium benzoate, sodium phenylacetate, potassium p-toluate, and mixtures thereof.

The alkali metal carboxylate can be prepared by adding and reacting almost the same chemical equivalents of an organic acid and at least one compound selected from the group consisting of an alkali metal hydroxide, an alkali metal carbonate and an alkali metal bicarbonate. Among the above alkali metal carboxylates, the lithium salt is highly soluble in the reaction system and thus has a great effect as an auxiliary agent but is expensive. Potassium, rubidium and cesium salts are considered to be insufficiently soluble in the reaction system. Therefore, sodium acetate which is inexpensive and has appropriate solubility in a polymerization system is the most preferably used.

When these alkali metal carboxylates are used as a polymerization auxiliary agent, the amount to be used is usually in a range of 0.01 mol to 2 mol per mole of the charged alkali metal sulfide, and from the viewpoint of obtaining a higher degree of polymerization, preferably in a range of 0.1 to 0.6 mol, and more preferably in a range of 0.2 to 0.5 mol.

When water is used as a polymerization auxiliary agent, the amount to be added is usually in a range of 0.3 mol to 15 mol per mole of the charged alkali metal sulfide, and from the viewpoint of obtaining a higher degree of polymerization, preferably in a range of 0.6 to 10 mol, and more preferably in a range of 1 to 5 mol.

It is certainly possible to use two or more of these polymerization auxiliary agents in combination. For example, when an alkali metal carboxylate is used in combination with water, smaller amounts of each can increase the molecular weight.

The timing of adding these polymerization auxiliary agents is not particularly specified, and the polymerization auxiliary agent may be added at the time of the preliminary process, the initiation of polymerization, or during the polymerization, which will be described later. The polymerization auxiliary agent may also be added in several portions, and in the case of using an alkali metal carboxylate as a polymerization auxiliary agent, the simultaneous addition at the start of the preliminary process or at the start of the polymerization is preferred from the viewpoint of an easy addition. When water is used as a polymerization auxiliary agent, it is effective that the water is added during the polymerization reaction after the polyhalogenated aromatic compound is charged.

[Polymerization Stabilizer]

In order to stabilize the polymerization reaction system and prevent side reactions, a polymerization stabilizer can also be used. The polymerization stabilizer contributes to the stabilization of the polymerization reaction system and suppresses undesirable side reactions. One indication of side reactions is the formation of thiophenol, and the addition of a polymerization stabilizer can suppress the formation of thiophenol. Specific examples of polymerization stabilizers include compounds such as alkali metal hydroxides, alkali metal carbonates, alkaline earth metal hydroxides and alkaline earth metal carbonates. Among them, alkali metal hydroxides such as sodium hydroxide, potassium hydroxide, and lithium hydroxide are preferred. The alkali metal carboxylates as described above also function as a polymerization stabilizer, and hence are included as one of the polymerization stabilizers. It is described above that an alkali metal hydroxide is preferably used at the same time when an alkali metal hydrosulfide is used as a sulfiding agent. In this case, the alkali metal hydroxide which is excess for the sulfiding agent can be also a polymerization stabilizer.

One of these polymerization stabilizers can be used alone, or two or more kinds can be used in combination. Usually, the polymerization stabilizer is preferably used in a proportion of 0.02 to 0.2 mol, preferably of 0.03 to 0.1 mol, and more preferably of 0.04 to 0.09 mol per mole of the charged alkali metal sulfide. If this proportion is small, the stabilizing effect is not sufficient. Conversely, too large a proportion is economically disadvantageous or tends to decrease the yield of the polymer.

The timing of adding a polymerization stabilizer is not particularly specified, and the polymerization stabilizer may be added at the time of the preliminary process, the initiation of polymerization, or during the polymerization, which will be described later. The polymerization stabilizer may also be added in several portions, and a simultaneous addition at the start of the preliminary process or at the start of the polymerization is preferred from the viewpoint of easiness.

The preferred production method of the PPS resin (A) used in the present invention will be explained in detail step by step in the order of the preliminary step, the polymerization reaction step, the collection step and the post treatment step, but the method is not limited to this method.

[Preliminary Step]

In the method of producing a PPS resin (A), a sulfiding agent is usually used in the form of a hydrate. Before adding a polyhalogenated aromatic compound, a mixture containing a polar organic solvent and a sulfiding agent is preferably heated to raise the temperature and to remove the excess amount water out of the system.

As described above, as a sulfiding agent, a sulfiding agent prepared from an alkali metal hydrosulfide and an alkali metal hydroxide in situ in the reaction system or in a different tank than the polymerization tank can be also used. Although there is no particular limitation on this method, as an example, an alkali metal hydrosulfide and an alkali metal hydroxide are added to a polar organic solvent desirably in an inert gas atmosphere at a temperature ranging from room temperature to 150° C., preferably from room temperature to 100° C., and then the temperature is raised to 150° C. or more at least, preferably 180 to 260° C. under atmospheric pressure or reduced pressure to distill out the moisture. A polymerization auxiliary agent may be added at this stage. In order to accelerate the distillation for removing the moisture, toluene or the like may be added to carry out a reaction.

In the polymerization reaction, the amount of the moisture in the polymerization system is preferably 03 to 10.0 mol per mole of the charged sulfiding agent. The amount of the moisture in the polymerization system as used herein is an amount obtained by subtracting the amount of the moisture removed outside the polymerization system from the amount of the moisture charged in the polymerization system. The water to be charged may be in any form such as water, aqueous solution, water of crystallization or the like.

[Polymerization Reaction Step]

The sulfiding agent and the polyhalogenated aromatic compound are reacted in the polar organic solvent at a temperature ranging from 200° C. or more and less than 290° C. to produce a PPS resin (A).

When the polymerization reaction step starts, the polar organic solvent, the sulfiding agent and the polyhalogenated aromatic compound are mixed desirably under an inert gas atmosphere at a temperature ranging from room temperature to 240° C., preferably from 100° C. to 230° C. A polymerization auxiliary agent may be added at this stage. These raw materials may be added in a random order or at the same time.

The resulting mixture is usually heated to raise the temperature to the range from 200° C. to 290° C. The rate of temperature rise is not particularly limited, but usually the rate from 0.01° C./min to 5° C./min is selected, and the range of 0.1° C./min to 3° C./min is more preferred.

Generally, the temperature is raised eventually to 250° C. to 290° C., and the mixture is reacted at this temperature for usually 0.25 hours to 50 hours, and preferably 0.5 hours to 20 hours.

Before reaching the final temperature, a method in which the mixture is reacted for example at 200° C. to 260° C. for a certain period, and then the temperature is raised to 270° C. to 290° C. is effective for obtaining a higher degree of polymerization. In this case, for the duration of the reaction at 200° C. to 260° C., usually the range of 0.25 hours to 20 hours is selected, and the range of 0.25 hours to 10 hours is preferably selected.

In order to obtain a polymer with a higher degree of polymerization, it can be effective that the polymerization is performed in a plurality of stages. When the polymerization is carried out in a plurality of stages, the moment when that the conversion rate of the polyhalogenated aromatic compound in the system at 245° C. reaches 40% by mole or more, preferably 60% by mole is effective.

The conversion rate of the polyhalogenated aromatic compound (abbreviated as PHA here) is a value calculated according to the following equation. The residual amount of the PHA can be usually determined by a method of gas chromatography.

(a) when the polyhalogenated aromatic compound is added at an excess molar ratio with respect to the alkali metal sulfide The conversion rate=[charged amount of PHA (mol)−residual amount of PHA (mol)]/[charged amount of PHA (mol)−excess amount of PHA (mol)]

(b) in cases other than the above (a)

The conversion rate=[charged amount of PHA (mol)−residual amount of PHA (mol)]/[charged amount of PHA (mol)]

[Collection Step]

In the method of producing a PPS resin (A), after the polymerization is completed, a solid material is collected from a polymerization reaction product containing a polymer, a solvent and the like. Any known collection method may be applied.

For example, after the polymerization reaction ends, a method of slow cooling to collect a particulate polymer may be used. The rate of slow cooling in this case is not particularly limited, but usually about 0.1° C./min to 3° C./min. It is not necessary to perform the slow cooling at the same rate in the entire slow cooling step. A method of slow cooling at a rate of 0.1° C./min to 1° C./min until the polymer particles crystallize, and then at a rate of 1° C./min or more, or the like may be applied.

A method of carrying out the collection as described above under rapid cooling conditions is also one preferred method. One preferred example of this collection method includes a flash method. The flash method is a method in which a polymerization reaction product is flashed from a state of high temperature and high pressure (usually 250° C. or more and 8 kg/cm² or more) to an atmosphere of atmospheric pressure or reduced pressure to collect the polymer in a powder form at the same time as the collection of the solvent. The term "flash" as used herein means to eject a polymerization reaction product from a nozzle. Specific examples of the atmosphere into which a polymerization reaction product is flashed usually include nitrogen or steam in the atmospheric pressure, and the temperature range of 150° C. to 250° C. is usually selected.

[Post Treatment Step]

After its production through the above polymerization step and collection step, the PPS resin (A) may be subjected to an acid treatment, a treatment with hot water, washing with an organic solvent, or a treatment with an alkali metal or alkaline earth metal.

In the case of the acid treatment, the acid treatment is performed as follows. The acid used for the acid treatment of the PPS resin (A) is not particularly limited as long as it does not have an effect of decomposing the PPS resin (A), and examples thereof include acetic acid, hydrochloric acid, sulfuric acid, phosphoric acid, silicic acid, carbonic acid and propyl acid. Among them, acetic acid and hydrochloric acid are more preferably used. Those which decompose and deteriorate the PPS resin (A) such as nitric acid are not preferred.

As a method of the acid treatment, there is a method of immersing the PPS resin (A) in acid or an aqueous solution of acid, and if necessary, stirring or heating can be also performed as appropriate. For example, in the case of using acetic acid, a sufficient effect can be obtained by immersing the PPS resin powder in an aqueous solution of PH 4 heated to 80° C. to 200° C. and stirring the mixture for 30 minutes. The PH after the treatment may be 4 or more, for example about PH 4 to 8. The PPS resin (A) subjected to the acid treatment is preferably washed several times with water or warm water to remove the residual acid, salt or the like. The water used for washing is preferably distilled water or ion-exchanged water in order not to impair the effect of the preferred chemical modification of the PPS resin (A) by the acid treatment.

In the case of the treatment with hot water, the treatment is performed as follows. In the treatment with hot water of the PPS resin (A), the temperature of the hot water is preferably set at 100° C. or more, more preferably 120° C. or more, further preferably 150° C. or more, and particularly preferably 170° C. or more. The temperature of less than 100° C. is not preferred because the effect of the preferred chemical modification of the PPS resin (A) is small.

For the expression of the effect of the preferred chemical modification of the PPS resin (A) by washing with hot water, the water used for washing is preferably distilled water or ion-exchanged water. There is no particular limitation on the operation of the treatment with hot water. A method in which a predetermined amount of the PPS resin (A) is poured into a predetermined amount of water, heated and stirred in a pressure vessel, a method in which the treatment with hot water is continuously applied, or the like can be performed. For the ratio of the PPS resin (A) to water, more water is preferably used. Usually, a bath ratio of the PPS resin (A) of 200 g or less with respect to 1 liter of water is selected.

Since the decomposition of the end groups is not preferred, in order to avoid the decomposition, the atmosphere of the treatment is desirably under an inert atmosphere. The PPS resin (A) after this treatment with hot water is preferably washed several times with warm water to remove residual components.

In the case of washing with an organic solvent, the washing is performed as follows. The organic solvent used for washing the PPS resin (A) is not particularly limited as long as it does not have an effect of decomposing the PPS resin (A), and examples thereof include nitrogen-containing polar solvents such as N-methyl-2-pyrrolidone, dimethylformamide, dimethylacetamide, 1,3-dimethylimidazolidinone, hexamethylphosphorous amide and piperazinones, sulfoxide.sulfone solvents such as dimethylsulfoxide, dimethylsulfone, and sulfolane, ketone solvents such as acetone, methyl ethyl ketone, diethyl ketone, and acetophenone, ether solvents such as dimethyl ether, dipropyl ether, dioxane and tetrahydrofuran, halogen solvents such as chloroform, methylene chloride, trichloroethylene, ethylene dichloride, perchloroethylene, monochloroethane, dichloroethane, tetrachloroethane, perchloroethane, and chlorobenzene, alcohol-phenol solvents such as methanol, ethanol, propanol, butanol, pentanol, ethylene glycol, propylene glycol, phenol, cresol, polyethylene glycol, and polypropylene glycol, aromatic hydrocarbon solvents such as benzene, toluene and xylene, and the like. Among these organic solvents, N-methyl-2-pyrrolidone, acetone, dimethylformamide, chloroform and the like are particularly preferably used. One of these organic solvents can be used alone, or the mixture of two or more kinds can be used.

As a method of washing with an organic solvent, there is a method of immersing the PPS resin (A) in an organic solvent, and if necessary, stirring or heating can be also performed as appropriate. The washing temperature when the PPS resin (A) is washed with an organic solvent is not particularly limited, and any temperature from room temperature to 300° C. can be selected. Although the washing efficiency tends to increase as the washing temperature increases, normally a sufficient effect can be obtained at a washing temperature of room temperature to 150° C. It is also possible to perform the washing under increased pressure in a pressure vessel at a temperature equal to or higher than the boiling point of the organic solvent. The duration of the washing is not particularly limited, either. Depending on the washing conditions, in the case of batch type washing, a sufficient effect can be obtained by washing usually for 5 minutes or more. The continuous type washing is also possible.

Examples of methods of a treatment with an alkali metal or an alkaline earth metal include a method of adding an alkali metal salt or an alkaline earth metal salt before, during or after the preliminary step as described above, a method of adding an alkali metal salt or an alkaline earth metal salt to a polymerization tank before, during and after the polymerization step, a method of adding an alkali metal salt or an alkaline earth metal salt at the initial, intermediate or final stage of the washing step, and the like. Among them, the easiest method includes a method of adding an alkali metal salt or an alkaline earth metal salt after the removal of residual oligomers or residual salts by washing with an organic solvent, warm water or hot water. The alkali metal or alkaline earth metal is preferably introduced into the PPS resin in the form of an alkali metal ion or an alkaline earth metal ion such as an acetate, a hydroxide or a carbonate. The excess alkali metal salt and alkaline earth metal salt are preferably removed by washing with warm water or the like. The concentration of the alkali metal ion or the concentration of the alkaline earth metal ion upon introducing the alkali metal or the alkaline earth metal is preferably 0.001 mmol or more, and more preferably 0.01 mmol or more based on 1 g of the PPS. The temperature is preferably 50° C. or more, more preferably 75° C. or more, and particularly preferably 90° C. or more. Although there is no particular upper limit in the temperature, it is usually preferably 280° C. or less from the viewpoint of the operation performance. The bath ratio (the weight of a washing solution with respect to the dry weight of the PPS) is preferably 0.5 or more, more preferably 3 or more, and particularly preferably 5 or more.

In the present invention, from the viewpoint of obtaining a polyphenylene sulfide resin composition which is excellent in toughness and heat aging resistance, a preferred method is removing the residual oligomers and the residual salts by repeating the washing with an organic solvent and a hot water of about 80° C. or hot water as described above several times, followed by an acid treatment or a treatment with an alkali metal salt or an alkaline earth metal salt, and particularly preferably followed by a treatment with an alkali metal salt or an alkaline earth metal salt.

In addition, the PPS resin (A) can also be used after being subjected to a thermal oxidative cross-linking treatment following the completion of the polymerization, by heating under an oxygen atmosphere and heating with a cross-linking agent such as a peroxide to increase the molecular weight.

In the case of a dry heat treatment for the purpose of increasing the molecular weight by thermal oxidative cross-linking, the temperature is preferably 160° C. to 260° C., more preferably 170° C. to 250° C. Further, the oxygen concentration is desirably 5% by volume or more, and more desirably 8% by volume or more. The upper limit of the oxygen concentration is not particularly limited, but the limit is about 50% by volume. The duration of the treatment is preferably 0.5 hours to 100 hours, more preferably 1 hour to 50 hours, and further preferably 2 hours to 25 hours. The apparatus for the heat treatment may be either a regular hot air dryer or a rotary heating apparatus or a heating apparatus equipped with stirring blades. In the case of an efficient and more uniform treatment, a rotary heating apparatus or a heating apparatus equipped with stirring blades is preferably used.

It is also possible to suppress the thermal oxidative cross-linking and to perform a dry heat treatment for the purpose of removing a volatile content. The temperature for this is preferably in the range of 130° C. to 250° C., and more preferably in the range of 160° C. to 250° C. Further, the oxygen concentration in this case is desirably less than 5% by volume, and more desirably less than 2% by volume. The duration of the treatment is preferably 0.5 hours to 50 hours, more preferably 1 hour to 20 hours, and further preferably 1 hour to 10 hours. The apparatus for the heat treatment may be either a regular hot air dryer or a rotary heating apparatus or a heating apparatus equipped with stirring blades. In the case of an efficient and more uniform treatment, a rotary heating apparatus or a heating apparatus equipped with stirring blades is preferably used.

However, from the viewpoint of achieving excellent toughness, the PPS resin (A) of the present invention is preferably a substantially linear PPS resin which is not subjected to a thermal oxidative cross-linking treatment for a higher molecular weight, or a half cross-linked PPS resin which is lightly subjected to the oxidative cross-linking treatment. On the other hand, the PPS resin subjected to the thermal oxidative cross-linking treatment is suitable from the viewpoint of suppressing the creep strain, and can be appropriately mixed with a linear PPS resin and used. In the present invention, a plurality of the PPS resins (A) having different melt viscosities may be mixed and used.

The amino group-containing compounds (B) used in the present invention may be compounds containing an amino group, and examples thereof include polyvalent amine compounds, resins containing an amino group, and the like. From the viewpoint of preventing the bleed-out of the forming products, resins containing an amino group are preferred. Examples of resins containing an amino group include polyamide resins, polyamideimide resins, polyetherimide resins, polyetherimide siloxane copolymers, polyimide resins, and a combination thereof. From the viewpoint of the flexibility, polyamide resins, polyetherimide-siloxane copolymers are more preferred, and from the viewpoint of the compatibility with polyphenylene sulfide (A) and from the viewpoint of the cost, polyamide resins (hereinafter abbreviated as PA resin in some cases) are particularly preferred. The polyamide resin is a polyamide comprising an amino acid, a lactam or a diamine, and a dicarboxylic acid as a main constituent. Representative examples of the main constituents include amino acids such as 6-aminocaproic acid, 11-aminoundecanoic acid, 12-aminododecanoic acid, para-aminomethylbenzoic acid, lactams such as ε-amin-ocaprolactam, ω-laurolactam, aliphatic, alicylic and aromatic diamines such as tetramethylenediamine, hexamethylenediamine, 2-methylpentamethylenediamine, undecamethylenediamine, dodecamethylenediamine, 2,2,4-/2,4,4-trimethylhexamethylenediamine, 5-methylnonamethylenediamine, meta-xylenediamine, para-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and 2-methylpentamethylenediamine, and aliphatic, alicyclic, and aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid and dimer acids. In the present invention, polyamide homopolymers or copolymers derived from these raw materials can be used individually or in the form of mixtures.

In the present invention, examples of useful polyamide resins include polycaproamide (nylon 6), polyhexamethylene adipamide (nylon 66), polytetramethylene adipamide (nylon 46), polyhexamethylene sebacamide (nylon 610), Polyhexamethylene dodecamide (nylon 612), polydodecanamide (nylon 12), polyundecanamide (nylon 11), polyhexamethylene terephthalamide (nylon 6T), polyxylylene adipamide (nylon XD6), polynonamethylene terephthalamide (nylon 9T), polydecamethylene terephthalamide (nylon 10T), and mixtures or copolymers thereof.

Among them, from the viewpoint of obtaining better flexibility, a polyamide resin composed of structural units having a carbon number in the range of 10 to 16 per amide group is suitable, and examples of such a polyamide resin include polyhexamethylene sebacamide (nylon 610), polydodecanamide (nylon 12), polyundecanamide (nylon 11) and the like.

The degree of polymerization of these polyamide resins is not particularly limited, and the relative viscosity measured at 25° C. in a 98% solution of concentrated sulfuric acid (1 g of the polymer, 100 ml of concentrated sulfuric acid) is preferably in the range of 1.5 to 7.0. The range of 2.0 or more is particularly preferred, and the range of 2.5 or more is further preferred. The upper limit value is preferably 6.5 or less, and more preferably 5.5 or less. Alternatively, the polyamide resin preferably has a relative viscosity in the range of 1.0 to 7.0, particularly preferably the range of 1.5 to 5.0 as measured at 25° C. in meta-cresol (polymer concentration of 0.5% by weight).

The blending amount of such an amino group-containing compound (B) is, when the amino group-containing compound (B) is a low molecular weight compound, preferably in the range of 0.01 to 200 parts by weight, and more preferably in the range of 0.01 to 100 parts by weight based on 100 parts by weight of the polyphenylene sulfide resin (A). When the blending amount of the amino group-containing compound (B) with respect to 100 parts by weight of the polyphenylene sulfide resin (A) is 0.01 parts by weight or more, excellent chemical resistance and heat aging resistance are achieved. The blending amount of 200 parts by weight or less can suppress the bleed-out of the amino group-containing compound (B). When the amino group-containing compound (B) is a resin containing an amino group, the range of 0.01 to 200 parts by weight is preferred based on 100 parts by weight of the polyphenylene sulfide resin (A). One part by weight or more is more preferred, 10 parts by weight or more is further preferred, 15 parts by weight or more is still further preferred, and 20 parts by weight or more is particularly preferred. The upper limit value of the blending amount is preferably 100 parts by weight or less, further preferably 80 parts by weight or less, and still further preferably 60 parts by weight or less. When the blending amount of the amino group-containing compound (B) with respect to 100 parts by weight of the polyphenylene sulfide resin (A) is less than 0.01 parts by weight, poor toughness and flexibility are obtained. The range of more than 200 parts by weight is not preferred because the chemical resistance and the heat aging resistance are remarkably inferior.

As the epoxy group-containing elastomer (C) used in the present invention, specific examples include polyolefin copolymers containing an epoxy group. Examples of polyolefin polymers containing an epoxy group include olefin copolymers having a glycidyl ester, glycidyl ether, glycidyl diamine or the like in the side chain, double bond-containing olefin copolymers with its double bond moiety subjected to epoxy oxidation, and the like. Among these, olefin copolymers obtained by copolymerization of monomers having an epoxy group are suitable, and in particular, olefin copolymers comprising an α-olefin, and a glycidyl ester of an α,β-unsaturated acid as main constituents are suitably used.

Specific examples of such α-olefins include ethylene, propylene, butene-1,4-methylpentene-1, hexene-1, decene-1, octene-1. Among them, ethylene is preferably used. Two or more kinds of these can be used at the same time.

On the other hand, a glycidyl ester of an α,β-unsaturated acid is a compound represented by the general Formula

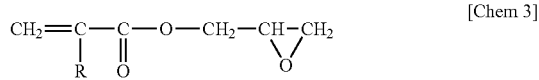
[Chem 3]

(wherein R is a hydrogen atom or a $C_1$-$C_5$ alkyl group), and specific examples thereof include glycidyl acrylate, glycidyl methacrylate, glycidyl ethacrylate and the like, and among them, glycidyl methacrylate is preferably Is used.

The olefin copolymer comprising an α-olefin and a glycidyl ester of α,β-unsaturated acid as main constituents may be any of copolymer types of a random copolymer, a block copolymer and a graft copolymer of an α-olefin and a glycidyl ester of an α,β-unsaturated acid.

In the olefin copolymer comprising an α-olefin and a glycidyl ester of an α,β-unsaturated acid as main constituents, the copolymerization amount of the glycidyl ester of an α,β-unsaturated acid is preferably 0.5 to 40% by weight, and particularly preferably 3 to 30% by weight from the viewpoint of the influence on the intended effect, polymerizability, gelation, heat resistance, flow property, the influence on the strength, and the like. As the epoxy group-containing olefin copolymer in the present invention, an epoxy group-containing olefin copolymer comprising as an essential component a monomer (3) represented by the following general Formula in addition to the α-olefin (1) and a glycidyl ester of an α,β-unsaturated acid (2) is also suitably used,

[Chem 4]

(wherein $R^1$ represents hydrogen or a $C_1$-$C_5$ alkyl group, X represents a group selected from a —$COOR^2$ group, a —CN group and an aromatic group, and $R^2$ represents a $C_1$-$C_{10}$ alkyl group).

The details of the α-olefin (1) and the glycidyl ester of an α,β-unsaturated acid (2) used in such an olefin copolymer are the same as those of the epoxy group-containing polyolefin polymer.

On the other hand, specific examples of the monomer (3) include α,β-unsaturated carboxylic acid alkyl esters such as methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate and isobutyl methacrylate, acrylonitrile, styrene, α-methylstyrene, styrene having an aromatic ring substituted with an alkyl group, acrylonitrile-styrene copolymer, and the like, and two or more kinds of these can be used at the same time.

Such an olefin copolymer may be any of copolymer types of a random copolymer, a block copolymer, a graft copolymer of the α-olefin (1), the glycidyl ester of an α,β-unsaturated acid (2) and the monomer (3), and a copolymer in which these copolymers are copolymerized, and for example, may be a copolymer of two or more copolymer types combined such as a random copolymer of the α-olefin (1) and the glycidyl ester of an α,β-unsaturated acid (2) to which the monomer (3) is graft copolymerized.

The copolymerization ratio of the olefin copolymer is preferably selected from the range of α-olefin (1)/glycidyl ester of an α,β-unsaturated acid (2)=60% by weight to 99% by weight/40% by weight to 1% by weight from the viewpoint of the influence on the intended effect, polymerizability, gelation, heat resistance, flow property, the influence on the strength, and the like. For the copolymerization ratio of the monomer (3), based on 95% by weight to 40% by weight of the total amount of the α-olefin (1) and the glycidyl ester of an α,β-unsaturated acid (2), the range of the monomer (3) of 5% by weight to 60% by weight is preferably selected.

From the viewpoint of achieving excellent toughness and flexibility, the blending amount of the epoxy group-containing elastomer (C) is, based on 100 parts by weight of the polyphenylene sulfide resin (A), preferably in a range of 1 to 200 parts by weight, more preferably more than 10 parts by weight, further preferably more than 15 parts by weight, still further preferably more than 20 parts by weight, and particularly preferably more than 30 parts by weight. As the upper limit of the blending amount, the range of preferably 150 parts by weight or less, further preferably 140 parts by weight or less, still further preferably 130 parts by weight or less, and particularly preferably 120 parts by weight or less is selected. The elastomer (C) of 1 part by weight or more is preferred because excellent toughness and flexibility are achieved, and the amount of 200 parts by weight or less is preferred because the increase in viscosity and thus the formation of a gelled material can be suppressed, causing no decrease in toughness.

In the present invention, it is possible to obtain more excellent toughness and flexibility by blending an elastomer (D) not containing a functional group along with the above-described epoxy group-containing elastomer (C). Specific examples of elastomers (D) not containing a functional group include polyolefin elastomers, diene elastomers, silicone rubber, fluorine rubber, urethane rubber, polyurethane thermoplastic elastomers, polyester thermoplastic elastomers, polyamide thermoplastic elastomers, and the like.

Specific examples of the polyolefin elastomer include olefin copolymers such as ethylene-propylene copolymers, ethylene-butene copolymers, ethylene-hexene copolymers, ethylene-octene copolymers, polybutene, and ethylene-propylene-diene copolymers.

Specific examples of the diene elastomers include styrene-butadiene copolymers, polybutadiene, butadiene-acrylonitrile copolymers, polyisoprene, butene-isoprene copolymers, SBS, SIS, SEBS, SEPS and the like.

Among them, ethylene-propylene copolymers, ethylene-butene copolymers, ethylene-hexene copolymers, ethylene-octene copolymers and ethylene-propylene-diene copolymers are particularly preferred.

Two kinds or more of such elastomers (D) not containing a functional group can be used in combination.

As for the blending amount of the elastomer (D) not containing a functional group, the total with the epoxy group-containing elastomer (C) is preferably in a range of 1 to 200 parts by weight based on 100 parts by weight of the polyphenylene sulfide resin (A). The lower limit of the blending amount is more preferably more than 10 parts by weight, further preferably more than 15 parts by weight, still further preferably more than 20 parts by weight, and particularly preferably more than 30 parts by weight, and the upper limit is 150 parts by weight or less, further preferably 140 parts by weight or less, still further preferably 130 parts by weight or less, and particularly preferably 120 parts by weight or less. When the blending amount of the elastomer (D) not containing a functional group as the total with the functional group-containing elastomer (C) exceeds 200 parts by weight, the elastomer (D) not containing a functional group is coarsely dispersed, resulting in more difficulty in achieving excellent toughness.

Furthermore, in the present invention, when the parts by weight of the epoxy group-containing elastomer (C), or the total parts by weight of the epoxy group-containing elastomer (C) and the elastomer (D) not containing a functional group is within a certain range with respect to the total parts by weight of the polyphenylene sulfide resin (A), the amino group-containing compound (B), the epoxy group-containing elastomer (C), and the elastomer (D) not containing a functional group, the flexibility can be enhanced remarkably. Specifically, when the total parts by weight of the polyphenylene sulfide resin (A), the amino group-containing compound (B), the epoxy group-containing elastomer (C), and the elastomer (D) not containing a functional group is 100% by weight, the upper limit of the parts by weight of the epoxy group-containing elastomer (C) or the total parts by weight of the epoxy group-containing elastomer (C) and the elastomer (D) not containing a functional group is preferably 70% by weight or less, more preferably 60% by weight or less, and from the viewpoint of the formability, further preferably 55% by weight or less, and particularly preferably 50% by weight or less. From the viewpoint of obtaining flexibility, the lower limit thereof is preferably more than 30% by weight. When the epoxy group-containing elastomer (C), or the total of the epoxy group-containing elastomer (C) and the elastomer (D) not containing a functional group is in such a range, both of the remarkable flexibility and formability tend to be obtained. In this case, when the blending ratio of the epoxy group-containing elastomer (C) and the elastomer (D) not containing a functional group is in a certain range, the toughness can be improved while the excellent flexibility is maintained. As this index, the epoxy group-containing elastomer ratio is used. The epoxy group-containing elastomer ratio is defined as a value determined as follows: the parts by weight of the epoxy group-containing elastomer (C) based on 100 parts by weight of the PPS resin(A)/(the parts by weight of the epoxy group-containing elastomer (C) based on 100 parts by weight of the PPS resin (A)+the parts by weight of the elastomer (D) not containing a functional group based on 100 parts by weight of the PPS resin (A)). The epoxy group-containing elastomer ratio is preferably 0.5 or more 1.0 or less, and more preferably 0.7 or more 1.0 or less. When the epoxy group-containing elastomer ratio is in such a range, the epoxy group-containing elastomer (C) and polyphenylene sulfide (A) react with each other sufficiently, and the dispersibility of the epoxy group-containing elastomer (C) and the elastomer (D) not containing a functional group improves, resulting in the achievement of excellent toughness. At the same time, the amino group-containing compound (B) and the epoxy group-containing elastomer (C) react with each other sufficiently, resulting in a higher viscosity and an easier formation of the continuous phase for the polyphenylene sulfide resin (A). Consequently, excellent heat resistance and chemical resistance tend to be obtained.

In the present invention, other components than the above (A), (B), (C), and (D) may be blended as necessary as long as the properties are not impaired. Specific examples thereof include additives, other thermoplastic resins, and fillers.

As an additive, from the viewpoint of improving further the toughness and the mechanical strength of the polyphenylene sulfide resin composition of the present invention, a compound having at least one functional group selected from epoxy groups, amino groups, and isocyanates groups is preferably added as a compatibilizing agent. The compatibilizing agent as used herein does not include the amino group-containing compound (B) and the epoxy group-containing elastomer (C) as described above.

Specific examples of such additives include, as epoxy group-containing compounds, glycidyl epoxy resins such as glycidyl ether epoxy compounds including glycidyl ethers of bisphenols, for example, bisphenol A, resorcinol, hydroquinone, pyrocatechol, bisphenol F, saligenin, 1,3,5-trihydroxybenzene, bisphenol S, trihydroxy-diphenyldimethylmethane, 4,4'-dihydroxybiphenyl, 1,5-dihydroxynaphthalene, cashew phenol, 2,2,5,5-tetrakis(4-hydroxyphenyl)hexane, and the like, those in which a halogenated bisphenol is used instead of a bisphenol, and a diglycidyl ether of butanediol and the like, glycidyl ester compounds, for example, phthalic acid-glycidyl esters and the like, glycidyl amine compounds, for example, N-glycidyl aniline and the like, linear epoxy compounds such as epoxidized polyolefins and epoxidized soybean oil, and cyclic diglycidyl epoxy resins such as vinylcyclohexene dioxide and dicyclopentadiene dioxide.

In addition, novolac type epoxy resins can be also included. A novolac type epoxy resin has two or more epoxy groups and is usually obtained by reacting epichlorohydrin with a novolac type phenolic resin. The novolac type phenol resin is obtained by a condensation reaction of a phenol and formaldehyde. The raw materials of phenols are not particularly limited, but examples thereof include phenol, o-cresol, m-cresol, p-cresol, bisphenol A, resorcinol, p-tertiary butylphenol, bisphenol F, bisphenol S and condensates thereof.

Furthermore, alkoxysilanes having an epoxy group can be included. Specific examples of such compounds include epoxy group-containing alkoxysilane compounds such as γ-glycidoxypropyltrimethoxysilane, γ-glycidoxypropyltriethoxysilane, β-(3,4-epoxycyclohexyl)ethyltrimethoxysilane and the like.

As amino group-containing compounds, alkoxysilanes having an amino group can be included. Specific examples of such compounds include amino group-containing alkoxysilane compounds such as γ-(2-aminoethyl)aminopropylmethyldimethoxysilane, γ-(2-aminoethyl)aminopropyltrimethoxysilane, γ-aminopropyltrimethoxysilane and the like.

Examples of compounds containing at least one isocyanate group include isocyanate compounds such as 2,4-tolylene diisocyanate, 2,5-tolylene diisocyanate, diphenylmethane-4,4'-diisocyanate and polymethylene polyphenyl polyisocyanate, and isocyanate group-containing alkoxysilane compounds such as γ-isocyanate propyltriethoxysilane, γ-isocyanate propyltrimethoxysilane, 7-isocyanate propylmethyldimethoxysilane, γ-isocyanate propylmethyldiethoxysilane, 7-isocyanate propylethyldimethoxysilane, γ-isocyanate propylethyldiethoxysilane, and γ-isocyanate propyltrichlorosilane.

Among these, in order to achieve the effect of improving stable and high toughness, at least one compound selected from compounds containing at least one isocyanate group and compounds containing two or more epoxy groups is preferred, and a compound containing at least one isocyanate group is more preferred.

The amount of the above additive to be blended is preferably 0.1 to 30 parts by weight, and more preferably 0.2 to 5 parts by weight based on 100 parts by weight of the polyphenylene sulfide resin (A).

Examples of other additives to be blended include antioxidants such as polyalkylene oxide oligomer compounds, thioether compounds, ester compounds, and hindered phenol compounds, plasticizers such as organophosphorus compounds, nucleating agents such as organophosphorus compounds and polyether ether ketones, montanic acid waxes, metal soaps such as lithium stearate and aluminum stearate, mold release agents such as ethylenediamine-stearic acid-sebacic acid polycondensation products and silicone compounds, anti-coloration agents such as hypophosphite salts, and other usual additives such as water, lubricants, ultraviolet inhibitors, coloring agents, and foaming agents.

When a polyamide resin is used as the amino group-containing compound (B), a copper compound can be preferably contained in order to improve the long-term heat resistance. Examples of copper compounds include copper (I) chloride, copper(II) chloride, copper(I) bromide, copper (II) bromide, copper(I) iodide, copper(II) iodide, copper(II) sulfate, copper(II) nitrate, copper phosphate, copper(I) acetate, copper(II) acetate, copper(II) salicylate, copper(II) stearate, copper(II) benzoate, and complex compounds of the above inorganic copper halides and xylylenediamine, 2-mercaptobenzimidazole, benzimidazole or the like. Two kinds or more of these can be blended. Among them, monovalent copper compounds, particularly monovalent copper halide compounds are preferred, and copper(I) acetate, copper(I) iodide and the like are preferred. Usually, the content of the copper compound is preferably 0.01 parts by weight or more, and more preferably 0.015 parts by weight or more based on 100 parts by weight of the polyamide resin used as the amino group-containing compound (B). If the content is too large, the metallic copper is released at the time of the melt molding and the value of the product is reduced by the coloration. Therefore, the upper limit of the amount to be added is preferably 2 parts by weight or less, more preferably 1 part by weight or less.

Further, an alkali halide may be blended in combination with the copper compound. Examples of alkali halide compounds include lithium chloride, lithium bromide, lithium iodide, potassium chloride, potassium bromide, potassium iodide, sodium bromide, sodium iodide and the like. Two kinds or more of these can be blended. Potassium iodide or sodium iodide is particularly preferred.

Other examples of thermoplastic resins include polyketone resins, polyarylate resins, liquid crystal polymers, polyether ketone resins, polythioether ketone resins, polyether ether ketone resins, polyether imide resins, polyether sulfone resins, polyimide resins, polyamide imide resins, polytetrafluoroethylene resins, ethylene tetrafluoroethylene copolymers, and the like.

Examples of fillers to be used include fibrous fillers such as glass fibers, carbon fibers, carbon nanotubes, carbon nanohorns, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metal fibers, or fullerene, silicates such as talc, wollastonite, zeolite, sericite, mica, kaolin, clay, pyrophyllite, silica, bentonite, asbestos, and alumina silicate, metal compounds such as silicon oxide, magnesium oxide, alumina, zirconium oxide, titanium oxide, and iron oxide, carbonates such as calcium carbonate, magnesium carbonate and dolomite, sulfates such as calcium sulfate and barium sulfate, hydroxides such as calcium hydroxide, magnesium hydroxide and aluminum hydroxide, non-fibrous fillers such as glass beads, glass flakes, glass powder, ceramic beads, boron nitride, silicon carbide, carbon black, silica and graphite, and these inorganic fillers may be hollow, and two or more of them may be used in combination. In addition, these inorganic fillers may be pretreated with a coupling agent such as an isocyanate compound, an organosilane compound, an organic titanate compound, an organoborane compound, or an epoxy compound before use. Among them, calcium carbonate, silica and carbon black are preferred from the viewpoint of the effect as anti-corrosion materials, lubricating materials and the effect of imparting conductivity.

For the amount to be added of each of other above-described components, the amount exceeding 20% by weight of the whole composition is not preferred because the inherent properties are impaired. The amount to be added is preferably 10% by weight or less, and more preferably 5% by weight or less.

In the polyphenylene sulfide resin composition of the present invention, the modulus of elongation (the elastic modulus determined by performing a tensile test on an ASTM type 1 dumbbell test piece obtained by injection molding at a cylinder temperature of 300° C. and at a mold temperature of 150° C., under the conditions in which the distance between chucks is 114 mm, the test piece distance is 100 mm, and the elongation rate is 10 mm/min) has to be 1.0 MPa or more and 1000 MPa or less. From the viewpoint of obtaining excellent vibration absorption, the modulus of elongation is preferably 900 MPa or less, and from the viewpoint of obtaining more excellent vibration absorption, preferably 800 MPa or less, and from the viewpoint of obtaining particularly excellent vibration absorption, particularly preferably 700 MPa or less. Furthermore, from the viewpoint of achieving an excellent assembling property of the forming products, the modulus of elongation is preferably 600 MPa or less, and from the viewpoint of achieving a particularly excellent assembling property of the forming products, particularly preferably 500 MPa or less. From the viewpoint of achieving high flexibility, a lower modulus of elongation is preferred, but in terms of maintenance of the shape of the forming products, the modulus of elongation is preferably 10 MPa or more, and in terms of more excellent maintenance of the shape of the forming products, preferably 30 MPa or more, and in terms of particularly excellent maintenance of the shape of the forming products, particularly preferably 50 MPa or more. The modulus of elongation of less than 1.0 MPa is not preferred because of the large deformation of the forming products when a used, for example, in an environment of a high temperature, resulting in more difficult maintenance of the shape.

The melt viscosity of the polyphenylene sulfide resin composition of the present invention is preferably in a range of more than 200 Pa·s, and more preferably of 300 Pa·s or more from the viewpoint of suppressing draw-down during blow molding. From the viewpoint of achieving excellent heat aging resistance, the melt viscosity is further preferably 500 Pa·s or more, and particularly preferably 650 Pa·s or more. From the viewpoint of maintaining the melt flow property, the upper limit is preferably 2000 Pa·s or less. The melt viscosity of less than 200 Pa·s is not preferred because the blow molding becomes complicated and the heat aging resistance decreases.

In the present invention, the melt viscosity of the resin composition is a value measured using Capilograph manufactured by TOYO SEIKI SEISAKU-SHO, LTD under the conditions of 300° C. and the shear rate of 1216/s.

In the polyphenylene sulfide resin composition of the present invention, it is necessary that the polyphenylene sulfide resin (A) form a continuous phase and the amino group-containing compound (B) and the epoxy group-containing elastomer (C) form a dispersed phase in the phase-separated structure of the forming product observed with a transmission electron microscope. When the modulus of elongation of polyphenylene sulfide resin composition is in a range of 1.0 MPa or more and 1000 MPa or less and the polyphenylene sulfide resin (A) is a continuous phase, not only high flexibility and high toughness but also unprecedented, excellent heat aging resistance can be obtained along with the excellent chemical resistance or the like which is derived from the polyphenylene sulfide resin (A). The description that "the amino group-containing compound (B) and the epoxy group-containing elastomer (C) form a dispersed phase" indicates that a dispersed phase containing both of the amino group-containing compound (B) and the epoxy group-containing elastomer (C) is formed. As long as one dispersed phase contains both of the component (B) and the component (C), other components may be contained. For example, a reaction product from the reaction of the component (B) and the component (C) may be contained, or a part of the component (A) may be contained. As long as a dispersed phase containing both of the component (B) and the component (C) is present, a dispersed phase of the component (B) alone may be present, or a dispersed phase of the component (C) alone may be present. Furthermore, in the dispersed phase, a bicontinuous structure of the component (B) and the component (C) may be present. A structure in which the epoxy group-containing elastomer (C) forms a dispersed phase and the amino group-containing compound (B) form a secondary dispersed phase therein, or a structure in which the epoxy group-containing elastomer (C) forms a secondary dispersed phase in the dispersed phase of the amino group-containing compound (B) may be present. From the viewpoint of obtaining more excellent heat aging resistance, in the structure of one dispersed phase containing both of the amino group-containing compound (B) and the epoxy group-containing elastomer (C), it is preferred that the amino group-containing compound (B) forms a secondary dispersed phase in the dispersed phase of the epoxy group-containing elastomer (C).

In order to form such a phase structure, it is necessary that the amino group-containing compound (B) and the epoxy group-containing elastomer (C) should be reacted sufficiently to increase the viscosity. By undergoing this reaction, it is possible to make the polyphenylene sulfide resin (A) a continuous phase even when the polyphenylene sulfide resin composition has a small weight ratio of the polyphenylene sulfide resin (A). When an elastomer containing an acid anhydrous group, a carboxyl group, a salt thereof and the like is used instead of the epoxy group-containing elastomer (C), the increase in the viscosity does not proceed sufficiently, and the formation of the continuous phase by the polyphenylene sulfide resin (A) becomes difficult. As a result, the heat resistance, the chemical resistance, and the heat aging resistance are impaired. Therefore, it is the most preferred that the polyphenylene sulfide resin composition of the present invention does not contain an elastomer containing a functional group such as an acid anhydrous group, a carboxyl group, a salt thereof, and the like. Even if such an elastomer is contained, it is preferably 10 parts by weight or less, and more preferably 5 parts by weight or less based on 100 parts by weight of the polyphenylene sulfide resin (A). Examples of methods of forming such a phase structure include melt kneading, using an extruder equipped with a stirring screw having a notch portion, which will be described later, when a resin composition is produced.

The dispersed phase composed of the amino group-containing compound (B) of the polyphenylene sulfide resin composition of the present invention has preferably a number-average dispersion particle diameter of 2000 nm or less, more preferably 1500 nm or less, and particularly preferably 1000 nm or less in order to achieve excellent toughness and heat aging resistance. The dispersed phase composed of the amino group-containing compound (B) has a lower limit of 10 nm as a number-average dispersion particle diameter.

The dispersed phase composed of the epoxy group-containing elastomer (C) of the polyphenylene sulfide resin composition of the present invention has preferably a number-average dispersion particle diameter of 1000 nm or less in order to achieve excellent toughness and flexibility. The dispersed phase composed of the epoxy group-containing elastomer (C) has a lower limit of 5 nm as a number-average dispersion particle diameter.

Moreover, as described above, the polyphenylene sulfide resin composition of the present invention may be blended with an elastomer (D) not containing a functional group in combination with the epoxy group-containing elastomer (C). In this case, the elastomer (D) not containing a functional group also forms a dispersed phase. The number-average dispersion particle diameter of this dispersed phase is preferably 2000 nm or less, and more preferably 1500 nm or less in order to achieve excellent toughness and flexibility. The dispersed phase composed of the elastomer (D) not containing a functional group has a lower limit of 10 nm as a number-average dispersion particle diameter.

The polyphenylene sulfide resin composition of the present invention preferably has a phase structure in which the amino group-containing compound (B) is dispersed as a secondary dispersed phase in the dispersed phase composed of the epoxy group-containing elastomer (C), and the number-average dispersion particle diameter of the secondary dispersed phase is preferably 1000 nm or less, more preferably 500 nm or less, and particularly preferably 300 nm or less in order to achieve excellent toughness, flexibility, heat aging resistance, and chemical resistance. The number-average dispersion particle diameter of the secondary dispersed phase of the amino group-containing compound (B) in the dispersed phase composed of the epoxy group-containing elastomer (C) has a lower limit of 5 nm.

The polyphenylene sulfide resin composition of the present invention in which such a phase structure is formed has not only high flexibility and toughness but also excellent heat aging resistance, and is preferred because the tensile property after the durability treatment in the air under the conditions of 170° C.×700 hr shows a tensile elongation maintenance ratio of 40% or more while the modulus of elongation is in the range of 1.0 MPa or more and 1000 MPa or less. The tensile elongation maintenance ratio is preferably 50% or more, further preferably 60% or more, and still further preferably 70% or more. The tensile elongation maintenance ratio as used herein refers to the tensile elongation after the durability treatment in the air under the conditions of 170° C.×700 hr with respect to the tensile elongation prior to the durability treatment in the air under the conditions of 170° C.×700 hr.

The polyphenylene sulfide resin composition of the present invention has a property excellent in acid resistance and, for example, is used suitably as a duct that comes in contact with exhaust condensation water of the internal combustion engine. The polyphenylene sulfide resin composition of the present invention is preferred because it has a tensile elongation maintenance ratio of 80% or more after a treatment in which the polyphenylene sulfide resin composition is completely immersed in a liquid which imitates the exhaust condensation water (pH3, $Cl^-$: about 300 ppm, $NO_2^-$: about 400 ppm, $NO_3^-$: about 400 ppm, $SO_3^-$: about 300 ppm, $SO_4^{2-}$: about 1300 ppm, HCHO: about 400 ppm, HCOOH: about 400 ppm, $CH_3COOH$: about 2000 ppm) under the conditions of 80° C.×12 hr, and a cycle of drying under the conditions of 150° C.×12 hr is repeated 5 times. A tensile elongation maintenance ratio of 90% or more can be mentioned as an example of a preferred range. This tensile elongation maintenance ratio refers to the tensile elongation after the immersion treatment of the polyphenylene sulfide resin composition in a liquid imitating exhaust condensation water as described above with respect to the tensile elongation prior to the immersion treatment.

Regarding these phase-separated structures, as an example, ultra thin slices are cut out from a pellet, a blow molding product, an injection molding product or the like of the polyphenylene sulfide resin composition, using an ultramicrotome, and from these ultra thin slices, a sample stained with ruthenium tetroxide or the like and an unstained sample are prepared and observed with a transmission electron microscope at a magnification of 5000 to 10000 times, and 10 different dispersed phases are selected arbitrarily, then the longest diameter and the shortest diameter for each dispersed phase are determined, and the number average value of their average values can be calculated. The identification of components which constitute the dispersed particles can be determined by comparing the contrast difference in the unstained phase and the contrast difference in the phase stained with ruthenium tetroxide or the like.

The method of producing a polyphenylene sulfide resin composition of the present invention is not particularly limited, and one representative example is a method of feeding raw materials to a usually known melt kneading machine such as a single screw or twin screw extruder, a Banbury mixer, kneader, a mixing roll, or the like, and melt kneading the mixture at the resin temperature which is 5° C. to 100° C. higher than the melting peak temperature of the polyphenylene sulfide resin (A). In particular, the melt kneading in a twin screw extruder is preferred.

In the twin screw extruder, the ratio of the screw length L to the screw diameter D (L/D) is desirably 10 or more, more preferably 20 or more, and further preferably 30 or more. Usually, the L/D of the twin screw extruder has an upper limit of 60. The L/D of less than 10 results in insufficient kneading, and it is more likely that a desired phase structure as described above cannot be obtained easily.

In this case, the mixing order of the raw materials is not particularly limited, and any method can be used such as a method of blending and then melt kneading all the raw materials according to the above-mentioned method, a method of blending and then melt kneading a part of the raw materials according to the above-mentioned method, and blending the rest of the raw materials to the mixture and melt kneading the resulting mixture, or a method of blending a part of the raw materials and mixing the rest of the materials using a side feeder during the melt kneading with an extruder.

It is also preferred to suppress the gelation of the extruded string due to an excessive reaction of the amino group-containing compound (B) and the epoxy group-containing elastomer (C) and the resulting decrease in toughness. In order to achieve this, the screw structure of a stirring screw having a notch portion is preferred. The "notch" as used herein is obtained by cutting a part of the peak portion of a screw flight. The stirring screw having a notch portion allows for a higher resin filling rate. The molten resin is easily affected by the cylinder temperature of the extruder when passing a kneading portion to which the stirring screw is connected. By using a stirring screw having a notch portion, it is possible to decrease the temperature of the resin during the kneading because the molten resin which has been heated by the shear during the kneading is efficiently cooled. In addition, unlike the conventional process of grinding a resin, a stirring screw having a notch portion can perform kneading mainly based on stirring and mixing. Therefore, it is possible to obtain a desired phase-separated structure of the resin as described above in addition to the suppression of the decomposition of the resin due to the generated heat.

From the viewpoint of improving the cooling efficiency of the molten resin and the kneadability by filling the resin, the stirring screw having a notch portion preferably has the length of the screw pitch in the range of 0.1 D to 0.3 D when D is the screw diameter and a number of notches of 10 to 15 notches per pitch. The "length of the screw pitch" as used herein means the screw length between the peak portions of the screw when the screw rotates 360 degrees.

In a stirring type screw having a notch portion, the introduction of 3% or more of the total length L of the screw is preferred, and furthermore, the introduction of 5% or more is more preferred. The upper limit thereof is preferably 20% or less, and more preferably 15% or less.

It is preferred to suppress the gelation of the extruded string due to an excessive reaction of the amino group-containing compound (B) and the epoxy group-containing elastomer (C) and the resulting decrease in toughness. A preferred example therefor is a method of melt kneading while lowering the cylinder temperature of the extruder to a temperature lower than the melting point of the polyphenylene sulfide resin (A). Like this, by lowering the cylinder temperature of the extruder to a temperature lower than the melting point of the polyphenylene sulfide resin (A), the excessive reaction of the amino group-containing compound (B) and the epoxy group-containing elastomer (C) can be suppressed, and the melt viscosity during the melt kneading can be also increased. Thus, the stirring can be performed more efficiently by a stirring type screw having a notch portion as described above. As a result, the reaction of the amino group-containing compound (B) and the epoxy group-containing elastomer (C) can be carried out efficiently, and a phase structure in which the polyphenylene sulfide resin (A) forms a continuous phase while the amino group-containing compound (B) and the epoxy group-containing elastomer (C) form a dispersed phase is more easily obtained.

Specifically, although it is not always the case because the cylinder temperature of the extruder depends on the melting point of the polyphenylene sulfide resin (A), a preferred range of 230° C. or more and 285° C. or less can be shown as an example. In the cylinder block of the extruder, 30 to 80% is preferably in the temperature range as described above, and 50 to 80% is more preferably in the temperature range as described above. Furthermore, from the viewpoint of performing cooling and stirring efficiently by the stirring type screw having a notch portion, it is particularly preferred that the cylinder block corresponding to the site where a stirring type screw having a notch portion is installed is in the above temperature range.

The polyphenylene sulfide resin composition of the present invention can be molded in any method to obtain a forming product. Examples of molding methods include extrusion molding, injection molding, hollow molding, calendar molding, compression molding, vacuum molding, foam molding, blow molding, rotational molding and the like. Particularly, since the polyphenylene sulfide resin composition of the present invention has a relatively high melt viscosity, forming products are preferably obtained by blow molding from the viewpoint of suppressing draw-down during the molding. Examples of the blow molding include extrusion blow molding and injection blow molding, multilayer blow such as direct blow and exchange blow, multidimensional blow such as suction blow, injection blow, injection stretch blow and the like. Furthermore, the polyphenylene sulfide resin composition of the present invention is highly flexible and extremely excellent in toughness and has a characteristic excellent in heat aging resistance. Therefore, the polyphenylene sulfide resin composition of the present invention is particularly useful for the application in extrusion molding which has a relatively high molding processing temperature and a long residence time of the melt. Examples of forming products obtained by extrusion molding include round bars, square bars, sheets, films, tubes, pipes and the like. More specific examples of the uses include electric insulation materials for hot water dispenser motors, air conditioner motors, drive motors and the like, film capacitors, speaker diaphragms, magnetic tapes for recording, printed circuit board materials, printed circuit board peripheral parts, semiconductor packages, semiconductor transport trays, process-release films, protection films, film sensors for automobiles, insulation tapes of wire cables, insulation washers in lithium ion batteries, tubes for hot water, cold water, and chemicals, fuel tubes for automobiles, hot water piping, chemical piping such as in chemical plants, piping for ultrapure water and ultra high purity solvents, automobile piping, automobile cooling piping, piping pipes for Freon and supercritical carbon dioxide refrigerants, supporting rings of workpieces for polishing apparatus, and the like. In addition, other examples include covering molded products for motor coil winding wires of hybrid cars, electric cars, railroads, electric power facilities, wire harnesses and control wires of heat resistant electrical wire cables for household electric appliances, flat cables used for wiring inside automobiles, and the like, covering molded products of winding wires of transformers for signal such as communication, transmission, high frequency, audio, measurement, or in-vehicle transformers, and the like.

Examples of the uses of forming products obtained by injection molding and blow molding include electrical equipment parts such as power generators, electric motors, transformers, current transformers, voltage regulators, rectifiers, inverters, relays, electrical contacts for power, switches, circuit breakers, knife switches, other pole rods, and electric part cabinets, electronic parts including as representative examples sensors, LED lamps, connectors, sockets, resistors, relay cases, small switches, coil bobbins, condensers, variable capacitor cases, optical pickups, oscillators, various terminal boards, transformers, plugs, printed circuit boards, tuners, speakers, microphones, headphones, small motors, magnetic head bases, power modules, semiconductors, liquid crystals, FDD carriages, FDD chassis, motor brush holders, parabolic antennas, and computer-related parts; electrical alliances for home and desk work including as representative examples VTR parts, television parts, irons, hair dryers, rice cooker parts, microwave parts, acoustic parts, audio equipment parts such as audio and laser discs (registered trademark) and compact discs, lighting parts, refrigerator parts, air conditioner parts, typewriters parts, word processor parts, and the like; machine-related parts including as representative examples office computer-related parts, telephone-related parts, facsimile-related parts, copying machine-related parts, jigs for cleaning, motor parts, writers, typewriters, and the like: parts related to optical apparatus and precision apparatus including as representative examples microscopes, binoculars, cameras, watches and the like; parts related to automobiles and vehicles such as alternmator terminals, alternator connectors, IC regulators, potentiometer bases for light diers, various valves such as exhaust gas valves, automobile cooling piping, various pipes and ducts for fuels, exhaust systems and intake systems, turbo ducts, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, thermostat bases for air conditioning, flow control valves of heated hot air, brush holders for radiator motors, water pump impellers, turbine vanes, wiper motor-related parts, distributors, starter switches, starter relays, wire harnesses for transmission, wind washer nozzles, air conditioner panel switch boards, coils for fuel-related electromagnetic valves, fuse connectors, horn terminals, insulating plates of electrical components, step motor rotors, lamp sockets, lamp reflectors, lamp housings, brake pistons, solenoid bobbins, engine oil filters, and ignition device cases, gaskets for primary batteries or secondary batteries of mobile phones, laptop computers, video cameras, hybrid cars, electric cars and the like.

Among them, the forming products are useful as covering molded products for motor coil winding wires of hybrid cars, electric cars, railroads, electric power facilities and various pipes and ducts for fuels, exhaust systems and intake system of automobiles which are exposed to an environment of a high temperature, and especially as turbo ducts.

Particularly, with the advantage of characteristics excellent in toughness, flexibility, durability and acid resistance, the polyphenylene sulfide resin composition of the present invention is suitably used as a duct which comes in contact with exhaust condensation water of an internal combustion engine. It is noted that the term "exhaust condensation water" as used herein refers to water which results from the cooling and condensation of exhaust gas of an internal combustion engine including a car and which contains strongly corrosive ions derived from ammonia, sulfuric acid, chlorine, nitric acid, acetic acid, carbonic acid, and the like. More specific examples of ducts that touch the exhaust condensation water of the internal combustion engine include intake ducts of naturally aspirated engines, and intake ducts of a supercharged engines, in particular intake ducts between an air cleaner and a turbocharger and/or a supercharger, intake ducts between the turbocharger and/or supercharger and an intercooler, and intake ducts between the intercooler and the internal combustion engine. In particular, the forming product composed of the resin composition of the present invention is useful as an intake duct between a turbocharger and/or supercharger and an intercooler because it has both of excellent durability and excellent acid resistance as compared with a polyamide resin.

EXAMPLES

The effect of the present invention is explained in detail below by way of Examples, but the present invention is not limited to these Examples. Basic evaluations in each Example and Comparative Example were carried out in the following methods.

(1) Injection Molding

From a pellet obtained from each Example and Comparative Example, an ASTM type 1 dumbbell test piece was obtained by injection molding at a cylinder temperature of 300° C. and at a mold temperature of 150° C., using an injection molding machine SE75-DUZ manufactured by Sumitomo Heavy Industries, Ltd.

(2) The Initial Tensile Property at 23° C.

The ASTM type 1 dumbbell obtained by injection molding as described above was evaluated for its tensile property under the conditions in which the distance between chucks was 114 mm, the test piece distance was 100 mm, the elongation rate was 10 mm/min, using a Tensilon UTA2.5T tensile testing machine under the condition of 23° C.

(3) The Tensile Property at 23° C. Followed by the Durability Treatment Under the Conditions of 170° C.×700 hr The ASTM type 1 dumbbell obtained by injection molding as described above was treated in a PHH202 hot air dryer (manufactured by ESPEC CORP.) heated at 170° C. for 700 hr, and then allowed to cool at room temperature for 24 hr. Then, the dumbbell after the treatment was evaluated for its tensile property under the conditions in which the distance between chucks was 114 mm, the test piece distance was 100 mm, the elongation rate was 10 mm/min, using a Tensilon UTA2.5T tensile testing machine under the condition of 23° C.

(4) The Tensile Property at 23° C. Followed by the Immersion Treatment in Exhaust Condensation Water The ASTM type 1 dumbbell obtained by injection molding as described above was completely immersed in a liquid imitating the exhaust condensation water (pH3, $Cl^-$: about 300 ppm, $NO_2^-$: about 400 ppm, $NO_3^-$: about 400 ppm, $SO_3^-$: about 300 ppm, $SO_4^{2-}$: about 1300 ppm, HCHO: about 400 ppm, HCOOH: about 400 ppm, $CH_3COOH$: about 2000 ppm) under the conditions of 80° C.×12 hr, and a cycle of drying under conditions of 150° C.×12 hr was repeated 5 times.

Then, the dumbbell after the treatment was evaluated for its tensile property under the conditions in which the distance between chucks was 114 mm, the test piece distance was 100 mm, the elongation rate was 10 mm/min, using a Tensilon UTA2.5T tensile testing machine under the condition of 23° C.

(5) The Number-Average Dispersion Particle Diameter of the Dispersed Phase and the Secondary Dispersed Phase of the Dispersed Phase The ASTM type 1 dumbbell test piece obtained by injection molding as described above was cut at its center portion in a direction perpendicular to the flow direction of the resin, and then a thin piece of 0.1 μm or less was cut out from the center portion of the cross section at −20° C., using an ultramicrotome. After that, a sample stained with ruthenium tetroxide and an unstained sample were prepared. These samples were observed by a H-7100 type transmission electron microscope manufactured by Hitachi, Ltd. (resolution (particle image) of 0.38 nm, magnification a of 500,000 to 600,000 times), and arbitrarily different 10 sites were photographed with the magnification of 1000 to 10000 times. Using an image analysis software "Scion Image" manufactured by Scion Corporation, 10 different dispersed particles for each component present in the electron microscope images were arbitrarily selected, and the longest diameter and the shortest diameter for each dispersed phase was determined, and their average values were calculated as a number-average dispersion particle diameter. The components of the dispersed particles were identified by comparing the contrast difference in the unstained phase and the contrast difference in the phase stained with ruthenium tetroxide.

(6) Measurement of the Melt Viscosity

A pellet obtained from each Example and Comparative Example was measured under the conditions in which the test temperature was 300° C., the shear rate was 1216/s, the capillary length was 10 mm, and the capillary diameter was 1 mm, using Capilograph manufactured by TOYO SEIKI SEISAKU-SHO, LTD.

(7) Pressure Repetition Test

A pellet obtained from each Example and Comparative Example was subjected to a direct blow molding machine, and a hollow forming object having a thickness of 3 mm, a φ of 80 mm, and a length of 400 mm was molded under the conditions of a cylinder temperature of 300° C. and a mold temperature of 120° C. This hollow forming object was treated in a PHH202 hot air dryer (manufactured by ESPEC CORP.) heated at 170° C. for 700 hr, and then allowed to cool at room temperature for 24 hr. Compressed air was introduced to apply pressure so that the internal pressure would raise from 0 kPa to 200 kPa, and after this manipulation was repeated 1000 times, the evaluation was carried out as follows, depending on the number of times a pressure leak occurred.

Excellent: no pressure leak
Good: 500 times or more to less than 1000 times
Bad: less than 500 times Raw materials used in each Example and Comparative Example are shown in Reference Examples as follows.

[Reference Example 1] PPS Resin (A): A-1

A 70-liter autoclave equipped with a stirrer was charged with 8267.37 g (70.00 mol) of 47.5% sodium hydrosulfide, 2957.21 g (70.97 mol) of 96% sodium hydroxide, 11434.50 g (115.50 mol) of N-methyl-2-pyrrolidone (NMP), 2583.00 g (31.50 mol) of sodium acetate, and 10500 g of ion exchange water, and the resulting mixture was gradually heated to 245° C. over about 3 hours while passing nitrogen under normal pressure, and after 14780.1 g of water and 280 g of NMP were distilled out, the reaction vessel was cooled to 160° C. The amount of the residual moisture in the system per 1 mol of the charged alkali metal sulfide was 1.06 mol including the moisture consumed for the hydrolysis of NMP. Further, the amount of scattered hydrogen sulfide was 0.02 mol per 1 mol of the charged alkali metal sulfide.

Then, 10235.46 g (69.63 mol) of p-dichlorobenzene and 9009.00 g (91.00 mol) of NMP were added, and the reaction vessel was sealed under a nitrogen gas and heated to the temperature of 238° C. at the rate of 0.6° C./min while stirring at 240 rpm. After the reaction at 238° C. for 95 minutes, the temperature was raised to 270° C. at the rate of 0.8° C./min. After the reaction at 270° C. for 100 minutes, 1260 g (70 mol) of water was injected over 15 minutes to cool the mixture to 250° C. at the rate of 1.3° C./min. After that, the mixture was cooled to 200° C. at the rate of 1.0° C./min and then cooled rapidly to about a room temperature.

The content was taken out and diluted with 26300 g of NMP. The solvent and the solid were filtered off with a sieve (80 mesh), and the resulting particles were washed with 31900 g of NMP and filtered. The resulting particles were washed several times with 56000 g of ion exchange water, filtered off washed with 70000 g of a 0.05% by weight aqueous solution of acetic acid, and filtered. After washing with 70000 g of ion exchange water and filtration, the resulting water-containing PPS particles were dried with hot air at 80° C. and dried at 120° C. under reduced pressure. The resulting A-1 had a melt viscosity of 200 Pa·s (310° C., shear rate of 1000/s).

[Reference Example 2] The Amino Group-Containing Compound (B): B-1

Commercially available nylon 12 (manufactured by Arkema S.A., "Rilsamid" AESNO TL) was used.

[Reference Example 3] The Amino Group-Containing Compound (B): B-2

Commercially available nylon 610 (manufactured by Toray Industries, Inc., "Amilan" CM2021) was used.

[Reference Example 4] The Amino Group-Containing Compound (B): B-3

Commercially available poly(etherimide-siloxane) block copolymer (manufactured by Saudi Basic Industries Corporation Innovative Plastics, "SILTEM" 1500) was used.

[Reference Example 5] The Functional Group-Containing Elastomer (C): C-1

Commercially available ethylene and glycidyl methacrylate copolymer (manufactured by Sumitomo Chemical Company, Limited, "BONDFAST" 7M) was used.

[Reference Example 6] The Elastomer Containing a Functional Group Different than an Epoxy Group (C'): C'-1

Commercially available maleic anhydride modified ethylene and 1-butene copolymer (manufactured by Mitsui Chemicals Inc., "TAFMER" MH5020) was used.

[Reference Example 7] The Elastomer (D) not Containing a Functional Group: D-1

Commercially available ethylene and 1-butene copolymer (manufactured by Mitsui Chemicals Inc., "TAFMER" TX-610) was used.

[Reference Example 8] The Compatibilizing Agent (E): E-1

As a silane coupling agent having an isocyanate group, 3-isocyanate propyltriethoxysilane (manufactured by Shin-Etsu Chemical Co., Ltd., KBE-9007) was used.

Examples 1 to 7, Comparative Examples 1 to 4, 6 and 7

The raw materials shown in Tables 1, 2 and 3 were dry blended in the proportion shown in Tables 1, 2 and 3 and were subjected to melt kneading at a cylinder temperature of 230° C. and at a screw rotation speed of 300 rpm, using a TEX 30α type twin screw extruder (manufactured by The Japan Steel Works Ltd., L/D=45, 3 kneading portions, the proportion of the screw having a notch portion of 10%) equipped with a vacuum vent (kneading method: a), and then pelletized with a strand cutter. A pellet was dried overnight at 130° C., subjected to injection molding according to the method as described above, and then evaluated for various physical properties. In addition, a pellet which was dried overnight at 130° C. was subjected to direct blow molding according to the method as described above, and then the pressure repetition test was performed.

Comparative Example 5

The raw materials shown in Table 3 were dry blended in the proportion shown in Table 3 and were subjected to melt kneading at a cylinder temperature of 280° C. and at a screw rotation speed of 300 rpm, using a TEX 30a type twin screw extruder (manufactured by The Japan Steel Works Ltd., L/D=45, 3 kneading portions, the proportion of the screw having a notch portion of 0%) equipped with a vacuum vent (kneading method: b), and then pelletized with a strand cutter. The pellet was dried overnight at 130° C., subjected to injection molding according to the method as described above, and then evaluated for various physical properties. In addition, a pellet which was dried overnight at 130° C. was subjected to direct blow molding according to the method as described above, and then the pressure repetition test was performed.

[Comparative Example 8] (the Method Described in Patent Document 5)

To 100 parts by weight of the polyphenylene sulfide resin (A-1), 6 parts by weight of the functional group-containing elastomer (C-1) and 20 parts by weight of the elastomer (D-1) not containing a functional group were added and mixed, and using a TEX 30a type twin screw extruder (manufactured by The Japan Steel Works Ltd., L/D=45, 3 kneading portions, the proportion of the screw having a notch portion of 10%) equipped with a vacuum vent (kneading method: a), the resulting mixture was subjected to melt kneading at a cylinder temperature of 280° C. and at a screw rotation speed of 300 rpm, and then pelletized with a strand cutter. The modified polyphenylene sulfide resin thus produced is considered as A'-1.

Then, to 126 parts by weight of the modified polyphenylene sulfide resin (A'-1), 50 parts by weight of the polyamide resin (B-1) and 24 parts by weight of the elastomer containing another functional group (C'-1) were added and mixed, and using a TEX 30a type twin screw extruder (manufactured by The Japan Steel Works Ltd., L/D=45, 3 kneading portions, the proportion of the screw having a notch portion of 10%) equipped with a vacuum vent (kneading method: a), the resulting mixture was subjected to melt kneading at a cylinder temperature of 280° C. and at a screw rotation speed of 300 rpm, and then pelletized with a strand cutter. The resin composition obtained in the end was a result of blending each raw material shown in Table 3 in the blending amount shown in Table 3. A pellet was dried overnight at 130° C., subjected to injection molding according to the method as described above, and then evaluated for various physical properties. In addition, a pellet which was dried overnight at 130° C. was subjected to direct blow molding according to the method as described above, and then the pressure repetition test was performed.

[Comparative Example 9] (the Method Described in Patent Document 3)

To 100 parts by weight of the polyphenylene sulfide resin (A-1), 18 parts by weight of the functional group-containing elastomer (C-1) and 22 parts by weight of the elastomer (D-1) not containing a functional group were added and mixed, and using a TEX 30a type twin screw extruder (manufactured by The Japan Steel Works Ltd., L/D=45, 3 kneading portions, the proportion of the screw having a notch portion of 10%) equipped with a vacuum vent (kneading method a), the resulting mixture was subjected to melt kneading at a cylinder temperature of 280° C. and at a screw rotation speed of 300 rpm, and then pelletized with a strand cutter. The modified polyphenylene sulfide resin thus produced is considered as A'-2.

Then, to 44 parts by weight of the polyamide resin (B-1), 37 parts by weight of the elastomer containing another functional group (C'-1) was added and mixed, and using a TEX 30a type twin screw extruder (manufactured by The Japan Steel Works Ltd., L/D=45, 3 kneading portions, the proportion of the screw having a notch portion of 10%) equipped with a vacuum vent (kneading method: a), the resulting mixture was subjected to melt kneading at a cylinder temperature of 250° C. and at a screw rotation speed of 300 rpm, and then pelletized with a strand cutter. The modified polyamide resin thus produced is considered as B'-1.

The modified polyphenylene sulfide resin (A'-2) and the modified polyamide resin (B'-1) were dry blended in the composition shown in Table 3 and were subjected to melt kneading at a cylinder temperature of 280° C. and at a screw rotation speed of 300 rpm, using a TEX 30a type twin screw extruder (manufactured by The Japan Steel Works Ltd., L/D=45, 3 kneading portions, the proportion of the screw having a notch portion of 10%) equipped with a vacuum vent (kneading method: a), and then pelletized with a strand cutter. The resin composition obtained in the end was a result of blending each raw material shown in Table 3 in the blending amount shown in Table 3. A pellet was dried overnight at 130° C., subjected to injection molding according to the method as described above, and then evaluated for various physical properties. In addition, a pellet which was dried overnight at 130° C. was subjected to direct blow molding according to the method as described above, and then the pressure repetition test was performed.

TABLE 1

| | | | | Comparative Example 1 | Comparative Example 2 | Comparative Example 3 | Comparative Example 4 |
|---|---|---|---|---|---|---|---|
| Composition | | | | | | | |
| Polyphenylene sulfide (A) | | | Kind | A-1 | A-1 | A-1 | A-1 |
| | | | Parts by weight | 100 | 100 | 100 | 100 |
| Amino group-containing compound (B) | Polyamide | | Kind | | | | B-1 |
| | | | Parts by weight | | | | 54 |
| | Polyetherimide siloxane copolymer | | Kind | | | | |
| | | | Parts by weight | | | | |
| Epoxy group-containing elastomer (C) | | | Kind | C-1 | C-1 | C-1 | |
| | | | Parts by weight | 32 | 54 | 78 | |
| Elastomer containing a functional group different than an epoxy group (C') | | | Kind | | | | |
| | | | Parts by weight | | | | |
| Elastomer which does not contain a functional group (D) | | | Kind | | | | |
| | | | Parts by weight | | | | |
| Compatibilizing agent (E) | | | Kind | | | | |
| | | | Parts by weight | | | | |
| % by weight of the total amount of (C) and (D) when the total from (A) to (D) is 100% by weight | | | % by weight | 24 | 35 | 44 | — |
| Kneading method | | | | a | a | a | a |
| Resin processing temperature | | | | 305 | 309 | 314 | 302 |
| Evaluation | | | | | | | |
| Morphology | Continuous phase | Component | | PPS | PPS | Elastomer | PPS |
| | Dispersed phase (B) | Number-average dispersion particle diameter | nm | — | — | — | 450 |
| | Dispersed phase (C) | Component | | C | C | — | — |
| | | Number-average dispersion particle diameter | nm | 500 | 600 | — | — |
| | Secondary dispersed phase (B) In the dispersed phase (C) | Number-average dispersion particle diameter | nm | — | — | — | — |
| Physical properties | initial properties | Tensile elongation | % | 27 | 83 | 133 | 91 |
| | | Modulus of elongation | MPa | 1300 | 1020 | 440 | 1850 |
| | | Flexural strength | MPa | 54 | 36 | 15 | 66 |
| | | Flexural modulus | MPa | 1490 | 1070 | 370 | 2200 |

TABLE 1-continued

|  |  |  | Comparative Example 1 | Comparative Example 2 | Comparative Example 3 | Comparative Example 4 |
|---|---|---|---|---|---|---|
| 170° C. × 700 hr | Tensile elongation | % | 20 | 31 | 10 | 55 |
|  | Modulus of elongation | MPa | 1610 | 1100 | 400 | 2100 |
|  | Flexural strength | MPa | 58 | 38 | 12 | 68 |
|  | Flexural modulus | MPa | 1800 | 1200 | 360 | 2450 |
| After immersion in exhaust condensation water | Tensile elongation | % | 26 | 81 | 90 | 66 |
|  | Modulus of elongation | MPa | 1300 | 1030 | 450 | 1900 |
|  | Flexural strength | MPa | 54 | 37 | 15 | 67 |
|  | Flexural modulus | MPa | 1500 | 1100 | 360 | 2400 |
| Pressure repetition test |  |  | bad | bad | bad | bad |

Kneading method a: the proportion of the screw having a notch portion of 10%

Kneading method b: No screw having a notch portion

TABLE 2

|  |  |  | Example 1 | Example 2 | Example 3 | Example 4 | Example 5 | Example 6 | Example 7 |
|---|---|---|---|---|---|---|---|---|---|
| Composition |  |  |  |  |  |  |  |  |  |
| Polyphenylene sulfide (A) |  | Kind | A-1 | A-1 | A-1 | A-1 | A-1 | A-1 | A-1 |
|  |  | Parts by weight | 100 | 100 | 100 | 100 | 100 | 100 | 100 |
| Amino group-containing compound (B) | Polyamide | Kind | B-1 | B-1 | B-1 | B-1 | B-1 | B-2 |  |
|  |  | Parts by weight | 44 | 44 | 44 | 22 | 44 | 44 |  |
|  | Polyetherimide siloxane copolymer | Kind |  |  |  |  |  |  | B-3 |
|  |  | Parts by weight |  |  |  |  |  |  | 44 |
| Epoxy group-containing elastomer (C) |  | Kind | C-1 | C-1 | C-1 | C-1 | C-1 | C-1 | C-1 |
|  |  | Parts by weight | 45 | 78 | 55 | 71 | 55 | 77 | 55 |
| Elastomer containing a functional group different than an epoxy group (C') |  | Kind |  |  |  |  |  |  |  |
|  |  | Parts by weight |  |  |  |  |  |  |  |
| Elastomer which does not contain a functional group (D) |  | Kind |  |  | D-1 | D-1 | D-1 |  | D-1 |
|  |  | Parts by weight |  |  | 22 | 29 | 22 |  | 22 |
| Compatibilizing agent (E) |  | Kind |  |  |  |  | E-1 |  |  |
|  |  | Parts by weight |  |  |  |  | 0.8 |  |  |
| % by weight of the total amount of (C) and (D) when the total from (A) to (D) is 100% by weight |  | % by weight | 24 | 35 | 35 | 45 | 35 | 35 | 35 |
| Kneading method |  |  | a | a | a | a | a | a | a |
| Resin processing temperature |  |  | 325 | 320 | 311 | 308 | 325 | 322 | 325 |
| Evaluation |  |  |  |  |  |  |  |  |  |
| Morphology | Melt viscosity |  | Pa · s | 450 | 1140 | 840 | 520 | 1110 | 1130 | 660 |
|  | Continuous phase | Component |  | PPS | PPS | PPS | PPS | PPS | PPS | PPS |
|  | Dispersed phase (B) | Number-average dispersion particle diameter | nm | 1500 | 700 | 750 | 1000 | 500 | 450 | 900 |
|  | Dispersed phase (C) | Component |  | C | C | C | C | C | C | C |
|  |  | Number-average dispersion particle diameter | nm | 700 | 600 | 800 | 700 | 800 | 1000 | 900 |
|  | Secondary dispersed phase (3) in the dispersed phase (C) | Number-average dispersion particle diameter | nm | 600 | 400 | 400 | 500 | 200 | 300 | 300 |
| Physical properties | Initial properties | Tensile elongation | % | 78 | 125 | 94 | 80 | 132 | 123 | 92 |
|  |  | Modulus of elongation | MPa | 880 | 570 | 550 | 400 | 530 | 600 | 580 |
|  |  | Flexural strength | MPa | 35 | 27 | 25 | 17 | 25 | 27 | 27 |
|  |  | Flexural modulus | MPa | 1030 | 640 | 630 | 500 | 600 | 650 | 640 |

TABLE 2-continued

|  |  |  | Example 1 | Example 2 | Example 3 | Example 4 | Example 5 | Example 6 | Example 7 |
|---|---|---|---|---|---|---|---|---|---|
| 170° C. × 700 hr | Tensile elongation | % | 46 | 69 | 70 | 65 | 81 | 74 | 73 |
|  | Modulus of elongation | MPa | 890 | 590 | 560 | 450 | 550 | 680 | 700 |
|  | Flexural strength | MPa | 36 | 29 | 26 | 18 | 28 | 28 | 29 |
|  | Flexural modulus | MPa | 1080 | 670 | 660 | 530 | 650 | 740 | 770 |
| After immersion in exhaust | Tensile elongation | % | 76 | 120 | 91 | 69 | 125 | 120 | 85 |
|  | Modulus of elongation | MPa | 890 | 590 | 560 | 420 | 550 | 680 | 590 |
|  | Flexural strength | MPa | 36 | 28 | 26 | 18 | 26 | 26 | 27 |
| condensation water | Flexural modulus | MPa | 1080 | 650 | 660 | 510 | 620 | 660 | 670 |
| Pressure repetition test |  |  | good | excellent | excellent | excellent | excellent | excellent | excellent |

Melt viscosity under the conditions of 300° C. and the shear rate of 1216/s
Kneading method a: the proportion of the screw having a notch portion of 10%
Kneading method b: No screw having a notch portion

TABLE 3

|  |  |  |  | Comparative Example 5 | Comparative Example 6 | Comparative Example 7 | Comparative Example 8 | Comparative Example 9 |
|---|---|---|---|---|---|---|---|---|
| Composition |  |  |  |  |  |  |  |  |
| Polyphenylene sulfide (A) |  |  | Kind | A-1 | A-1 | A-1 | A-1 | A-1 |
|  |  |  | Parts by weight | 100 | 100 | 100 | 100 | 100 |
| Amino group-containing compound (B) | Polyamide |  | Kind | B-1 | B-1 | B-1 | B-1 | B-1 |
|  |  |  | Parts by weight | 44 | 44 | 44 | 50 | 44 |
|  | Polyetherimide siloxane copolymer |  | Kind |  |  |  |  |  |
|  |  |  | Parts by weight |  |  |  |  |  |
| Epoxy group-containing elastomer (C) |  |  | Kind | C-1 |  |  | C-1 | C-1 |
|  |  |  | Parts by weight | 45 |  |  | 6 | 18 |
| Elastomer containing a functional group different than an epoxy group (C') |  |  | Kind |  |  | C'-1 | C'-1 | C'-1 |
|  |  |  | Parts by weight |  |  | 78 | 24 | 37 |
| Elastomer which does not contain a functional group (D) |  |  | Kind |  | D-1 |  | D-1 | D-1 |
|  |  |  | Parts by weight |  | 78 |  | 20 | 22 |
| Compatibilizing agent (E) |  |  | Kind |  |  |  |  |  |
|  |  |  | Parts by weight |  |  |  |  |  |
| % by weight of the total amount of (C) and (D) when the total from (A) to (D) is 100% by weight |  |  | % by weight | 24 | 35 | 35 | 25 | 35 |
| Kneading method |  |  |  | b | a | a | a | a |
| Resin processing temperature |  |  |  | 380 | 340 | 334 | 340 | 343 |
| Evaluation |  |  |  |  |  |  |  |  |
|  | Melt viscosity |  | Pa·s | 280 | 240 | 180 | 300 | 350 |
| Morphology | Continuous phase | Component |  | PPS/PA bicontinuous | PPS/Elastomer bicontinuous | PA | PPS/PA bicontinuous | PPS/PA bicontinuous |
|  | Dispersed phase (B) | Number-average dispersion particle diameter | nm | 2200 | 2500 | — | 4000 | 2500 |
|  | Dispersed phase (C) | Component |  | C | C | C' | C | C |
|  |  | Number-average dispersion particle diameter | nm | 1400 | — | 150 | 200 | 300 |
|  | Secondary dispersed phase (B) in the dispersed phase (C) | Number-average dispersion particle diameter | nm | 1000 | — | — | — | — |
| Physical properties | initial properties | Tensile elongation | % | 50 | 45 | 48 | 167 | 70 |
|  |  | Modulus of elongation | MPa | 840 | 520 | 500 | 930 | 620 |
|  |  | Flexural strength | MPa | 35 | 25 | 20 | 42 | 30 |
|  |  | Flexural modulus | MPa | 1080 | 600 | 530 | 1130 | 720 |

TABLE 3-continued

|  |  |  | Comparative Example 5 | Comparative Example 6 | Comparative Example 7 | Comparative Example 8 | Comparative Example 9 |
|---|---|---|---|---|---|---|---|
| 170° C. × 700 hr | Tensile elongation | % | 15 | 9 | 13 | 31 | 27 |
|  | Modulus of elongation | MPa | 880 | 700 | 510 | 970 | 640 |
|  | Flexural strength | MPa | 38 | 30 | 22 | 41 | 31 |
|  | Flexural modulus | MPa | 1140 | 750 | 520 | 980 | 770 |
| After immersion in exhaust condensation water | Tensile elongation | % | 24 | 34 | 9 | 50 | 30 |
|  | Modulus of elongation | MPa | 850 | 530 | 510 | 970 | 640 |
|  | Flexural strength | MPa | 27 | 26 | 15 | 34 | 25 |
|  | Flexural modulus | MPa | 1100 | 610 | 480 | 850 | 700 |
| Pressure repetition test |  |  | bad | bad | bad | bad | bad |

Melt viscosity under the conditions of 300° C. and the shear rate of 1216/s
Kneading method a: the proportion of the screw having a notch portion of 10%
Kneading method b: No screw having a notch portion
In Comparative Example 9, the production was performed by subjecting the modified PPS resin and modified PA resin to melt kneading The results of the above Examples and Comparative Examples are compared and explained.

In Comparative Examples 1 and 2, although the polyphenylene sulfide resin (A) formed a continuous phase, the modulus of elongation exceeded 1000 MPa and the flexibility was not sufficient because of the small blending amount of the epoxy group-containing elastomer (C).

In Comparative Example 3, since the blending amount of the epoxy group-containing elastomer (C) was large, the modulus of elongation was low, indicating flexibility. However, since the elastomer formed a continuous phase, the tensile elongation followed by the treatment under the conditions of 170° C.×700 h decreased remarkably.

In Comparative Example 4, when polyamide (B) alone was blended as the amino group-containing compound (B), the modulus of elongation exceeded 1000 MPa, and the flexibility was not sufficient.

In Example 1, by subjecting the amino group-containing compound (B) and the epoxy group-containing elastomer (C) to melt kneading, the modulus of elongation was 1000 MPa or less, indicating flexibility, and the polyphenylene sulfide resin (A) formed a continuous phase. Consequently, even after the treatment under the conditions of 170° C.×700 h, a relatively high tensile elongation was maintained, and excellent heat aging resistance was shown. At the same time, a high tensile elongation was maintained even after the immersion in the exhaust condensation water. In the pressure repetition test, a pressure leak was observed during the 650th cycle.

On the other hand, in Comparative Example 5, although the melt kneading was performed with the same composition as in Example 1, since a stirring type mixing screw was not used, high shear heating occurred, causing the found value of the resin processing temperature to be as high as 380° C. Consequently, the amino group-containing compound (B) and the epoxy group-containing elastomer (C) reacted with each other excessively and gelated. As a result, the dispersed phase of the amino group-containing compound (B) was separated coarsely, and a bicontinuous structure of the polyphenylene sulfide resin (A) and the amino group-containing compound (B) was formed. As a result, the initial physical properties were relatively good, but the tensile elongation followed by the treatment under the conditions of 170° C.×700 h decreased remarkably, and in the pressure repetition test, a pressure leak was observed during the 150th cycle. The decrease in the tensile elongation followed by the immersion in the exhaust condensation water was also observed.

In Examples 2 to 4, when the total of the polyphenylene sulfide resin (A), the amino group-containing compound (B), the epoxy group-containing elastomer (C), and the elastomer (D) not containing a functional group was considered as 100% by weight, the total of the epoxy group-containing elastomer (C) and the elastomer component (D) not containing a functional group was increased to 35 to 45% by weight in comparison with Example 1. Therefore, a significant decrease in the modulus of elongation was observed. On the other hand, since the polyphenylene sulfide resin (A) formed a continuous phase, like in Example 1, the heat aging resistance was also good. As a result, in the pressure repetition test, no pressure leak was observed even after 1000 cycles were carried out. As in Example 1, the chemical resistance was also good.

In Comparative Example 6, the polyphenylene sulfide resin (A), the amino group-containing compound (B), and the elastomer (D) not containing a functional group were subjected to melt kneading. Therefore, a reaction did not occur between the amino group-containing compound (B) and the elastomer (D) not containing a functional group. Consequently, a bicontinuous structure of the polyphenylene resin (A) and the elastomer was observed. As a result, compared with Example 2, the heat aging resistance remarkably decreased, and the decrease in the chemical resistance was also observed.

In Comparative Example 7, the polyphenylene sulfide resin (A), the amino group-containing compound (B), and the maleic anhydride modified elastomer (C'-1) were subjected to melt kneading. Although the polyamide resin (B) and the maleic anhydride modified elastomer (C'-1) reacted with each other, the effect of increasing the viscosity was not obtained, and as a result, a continuous phase of the amino group-containing compound (B) was formed. Compared with Example 2, the heat aging resistance and the chemical resistance remarkably decreased.

In Example 5, a silane coupling agent was added as a compatibilizing agent. Consequently, the secondary dispersed phase of the amino group-containing compound (B) present in the dispersed phase composed of the epoxy group-containing elastomer (C) had a small number-average dispersion particle diameter, and compared with Example 3, the improvement of the heat aging resistance and the chemical resistance was observed.

In Examples 6 and 7, polyamide 610 (B-2) or a polyetherimide siloxane copolymer (B-3) which was used as the amino group-containing compound (B), and the epoxy group-containing elastomer (C) and the elastomer (D) not containing a functional group were subjected to melt kneading. The polyphenylene sulfide resin (A) formed a continuous phase, and a significant decrease in the modulus of elongation was observed. As a result, in the pressure repetition test, no pressure leak was observed even after 1000 cycles were carried out.

In Comparative Examples 8 and 9, the epoxy group-containing elastomer (C), the maleic anhydride modified elastomer (C'-1) and the elastomer (D) not containing a functional group were used in combination and subjected to melt kneading. Consequently, the amino group-containing compound (B) and the maleic anhydride modified elastomer (C'-1) reacted with each other preferentially. As a result, the effect of increasing the viscosity was not obtained, and a bicontinuous phase of the polyphenylene sulfide (A) and the amino group-containing compound (B) was formed. As a result, the initial physical properties were relatively good, but the tensile elongation followed by the treatment under the conditions of 170° C.×700 h decreased remarkably, and in the pressure repetition test, a pressure leak was observed during the 350th cycle and 440th cycle for each Comparative Example. The decrease in the tensile elongation followed by the immersion in the exhaust condensation water was also observed.

The invention claimed is:

1. A polyphenylene sulfide resin composition comprising a polyphenylene sulfide resin (A), an amino group-containing compound (B), and an epoxy group-containing elastomer (C), wherein said polyphenylene sulfide resin (A) forms a continuous phase consisting of polyphenylene sulfide resin (A) and optionally a compatibilizer and said amino group-containing compound (B) and said epoxy group-containing elastomer (C) form a dispersed phase in a morphology of a forming product composed of said resin composition observed with a transmission electron microscope, and a modulus of elongation, the elastic modulus determined by performing a tensile test on an ASTM type 1 dumbbell test piece obtained by injection molding at a cylinder temperature of 300° C. and at a mold temperature of 150° C., under the conditions in which the distance between chucks is 114 mm, the test piece distance is 100 mm, and the elongation rate is 10 mm/min, of said resin composition is 1.0 MPa or more and 1000 MPa or less, wherein said amino group-containing compound (B) is a polyamide resin.

2. The polyphenylene sulfide resin composition according to claim 1, comprising 0.01 to 200 parts by weight of said amino group-containing compound (B) and 1 to 200 parts by weight of said epoxy group-containing elastomer (C) based on 100 parts by weight of said polyphenylene sulfide resin (A).

3. The polyphenylene sulfide resin composition according to claim 1, wherein said epoxy group-containing elastomer (C) is more than 30% by weight and 70% by weight or less when the total of said polyphenylene sulfide resin (A), said amino group-containing compound (B), and said epoxy group-containing elastomer (C) is 100% by weight.

4. The polyphenylene sulfide resin composition according to claim 1, further comprising an elastomer (D) not containing a functional group in an amount such that the total amount of said elastomer (D) and said epoxy group-containing elastomer (C) is 200 parts by weight or less based on 100 parts by weight of said polyphenylene sulfide resin (A).

5. The polyphenylene sulfide resin composition according to claim 1, wherein said amino group-containing compound (B) forms a secondary dispersed phase in said dispersed phase of said epoxy group-containing elastomer (C).

6. The polyphenylene sulfide resin composition according to claim 1, which is a polyphenylene sulfide resin composition for an intake duct that contacts exhaust condensation water of an internal combustion engine.

7. A forming product composed of said polyphenylene sulfide resin composition according to claim 1.

8. The forming product according to claim 7, which is hollow.

9. A duct that contacts exhaust condensation water of an internal combustion engine comprising the forming product according to claim 8.

10. The duct according to claim 9, which is an intake duct.

11. The duct according to claim 9, which is an intake duct for a forced induction engine.

12. The duct according to claim 9, which is an intake duct for a forced induction engine that connects a turbocharger or a supercharger and an intercooler.

* * * * *